US011935679B2

(12) United States Patent
Kawasaki et al.

(10) Patent No.: US 11,935,679 B2
(45) **Date of Patent: *Mar. 19, 2024**

(54) COIL DEVICE

(71) Applicant: TDK CORPORATION, Tokyo (JP)

(72) Inventors: Yoshihiro Kawasaki, Tokyo (JP); Munehito Nishimura, Tokyo (JP); Setu Tsuchida, Tsuruoka (JP)

(73) Assignee: TDK CORPORATION, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 17/487,057

(22) Filed: Sep. 28, 2021

(65) Prior Publication Data

US 2022/0013274 A1 Jan. 13, 2022

Related U.S. Application Data

(63) Continuation of application No. 16/027,865, filed on Jul. 5, 2018, now Pat. No. 11,164,692.

(30) Foreign Application Priority Data

Jul. 11, 2017 (JP) ................................ 2017-135365
Dec. 18, 2017 (JP) ................................ 2017-242234

(51) Int. Cl.
*H01F 27/24* (2006.01)
*H01F 17/04* (2006.01)
(Continued)

(52) U.S. Cl.
CPC ............ *H01F 27/24* (2013.01); *H01F 17/04* (2013.01); *H01F 27/2823* (2013.01);
(Continued)

(58) Field of Classification Search
CPC ...... H01F 27/24; H01F 17/04; H01F 27/2823; H01F 27/2828; H01F 27/29;
(Continued)

(56) References Cited

U.S. PATENT DOCUMENTS 4,314,221 A * 2/1982 Satou .................... H01F 27/29 336/200
6,778,055 B1 8/2004 Wang
(Continued)

FOREIGN PATENT DOCUMENTS

CN 204463976 U 7/2015
JP 2009-147159 A 7/2009
(Continued)

OTHER PUBLICATIONS

Mar. 6, 2020 Office Action issued in U.S. Appl. No. 16/027,865.
May 20, 2020 Office Action issued in U.S. Appl. No. 16/027,865.
Oct. 8, 2020 Office Action issued in U.S. Appl. No. 16/027,865.

*Primary Examiner* — Mang Tin Bik Lian
(74) *Attorney, Agent, or Firm* — Oliff PLC

(57) ABSTRACT

A coil device includes: a core including a winding core part and a flange part at an axial end part of the winding core part, a coil part including a first wire and a second wire wound around the winding core part, a first terminal electrode, formed on a flange part mounting surface and a lead-out part of the first wire is connected, and a second terminal electrode, formed on the mounting surface of the flange part spaced apart from the first terminal electrode and a lead-out part of the second wire is connected, in which the flange part includes a concave part, recessed from the upper surface of the flange part and from an outer end surface of the flange
(Continued)

part in order to have bottoms. The coil device is easy to connect a wire and has excellent bonding strength even when the connecting part becomes the mounting surface.

11 Claims, 16 Drawing Sheets

(51) Int. Cl.

| | |
|---|---|
| ***H01F 27/28*** | (2006.01) |
| ***H01F 27/29*** | (2006.01) |
| ***H01F 41/064*** | (2016.01) |
| ***H01F 41/10*** | (2006.01) |

(52) U.S. Cl.
CPC ......... *H01F 27/2828* (2013.01); *H01F 27/29* (2013.01); *H01F 27/292* (2013.01); *H01F 41/064* (2016.01); *H01F 41/10* (2013.01); *H01F 17/045* (2013.01)

(58) Field of Classification Search
CPC ...... H01F 27/292; H01F 41/064; H01F 41/10; H01F 17/045; H01F 27/306
See application file for complete search history.

(56) References Cited

U.S. PATENT DOCUMENTS

| | | | | |
|---|---|---|---|---|
| 7,358,842 | B1 * | 4/2008 | Liu | H01F 38/10 336/200 |
| 2004/0263285 | A1 * | 12/2004 | Suzuki | H01F 41/082 333/185 |
| 2006/0170526 | A1 * | 8/2006 | Okumura | H01F 27/292 336/208 |
| 2010/0214050 | A1 | 8/2010 | Opina, Jr. et al. | |
| 2014/0292465 | A1 | 10/2014 | Takagi et al. | |
| 2014/0292467 | A1 * | 10/2014 | Tai | H01F 27/24 336/212 |
| 2015/0061811 | A1 | 3/2015 | Takagi et al. | |
| 2016/0240305 | A1 * | 8/2016 | Igarashi | H01F 27/2823 |
| 2016/0365191 | A1 | 12/2016 | Horie et al. | |
| 2017/0025212 | A1 | 1/2017 | Jerez et al. | |
| 2018/0019176 | A1 * | 1/2018 | Kanbe | H01F 27/30 |
| 2018/0342346 | A1 * | 11/2018 | Hashimoto | H01F 27/292 |

FOREIGN PATENT DOCUMENTS

| | | |
|---|---|---|
| JP | 2015-050373 A | 3/2015 |
| JP | 2017-005079 A | 1/2017 |

* cited by examiner

COIL DEVICE

RELATED APPLICATIONS

This is a Continuation Application of U.S. patent application Ser. No. 16/027,865 filed Jul. 5, 2018, which claims the benefit of Japanese Patent Application Nos. 2017-135365, filed Jul. 11, 2017, and 2017-242234, filed Dec. 18, 2017. The disclosure of the prior applications is hereby incorporated by reference herein in its entirety.

BACKGROUND OF THE INVENTION

1. Field of the Invention

The present invention relates to a coil device used as, for example, an inductor.

2. Description of the Related Art

Patent Document 1 discloses a coil device on which a terminal electrode, having a wire connected on the side opposite to the mounting surface, is formed. With the coil device described in Patent Document 1, there is a possibility that sufficient bonding strength between the coil device and the circuit board cannot be ensured when the terminal electrode and the wire are connected on the mounting surface.

PRIOR ART

Patent Document 1: JP 2009-147159A

DISCLOSURE OF THE INVENTION

Means for Solving the Problems

The present invention has been made in view of such circumstances, and an object of the present invention is to provide a coil device which is easy to connect a wire and has excellent bonding strength even when the connecting part becomes a mounting surface.

To achieve the above object, a coil device of the first object of the invention includes:

- a core including a winding core part and a flange part provided at an axial end part of the winding core part,
- a coil part including a first wire and a second wire wound around the winding core part,
- a first terminal electrode, formed on a mounting surface of the flange part and a lead-out part of the first wire is connected, and
- a second terminal electrode, formed on the mounting surface of the flange part spaced apart from the first terminal electrode and a lead-out part of the second wire is connected, in which
- the flange part includes a concave part, recessed from the mounting surface of the flange part and from an outer end surface of the flange part in order to have bottoms.

To achieve the above object, the core of the invention includes:

- a winding core part and
- a flange part provided at an axial end part of the winding core part, in which
- the flange part includes a concave part, recessed from a mounting surface of the flange part and from an outer end surface of the flange part in order to have bottoms.

In the coil device according to the first aspect of the present invention and the core according to the present invention, the flange part includes the concave part, recessed from the mounting surface of the flange part and from the outer end surface of the flange part in order to have bottoms. For this reason, at the time of cutting after connecting the wire, for example, a cutting position of the wire is arranged on the mounting surface side of the concave part, and the cutting is performed so as to enter the cutting tool to the bottom from the mounting surface of the concave part.

When the wire is cut while pressing a lead-out part with the cutting tool on the flange part, the flange part may be damaged, and it is not easy to cut the wire. In the present invention, since the wire can be cut in the above-described manner, the wire can be easily connected and cut.

Further, in the present invention, the concave part is recessed in order to have bottoms and is not extended to an inner end surface. Therefore, the outer end surface and the inner end surface of the flange part are not in communication with each other and are partitioned by a wall. Therefore, when cutting the wire, it can prevent cutting another wire incorrectly.

Further, with the above-described configuration, even if the concave part is formed in the flange part, the volume of the flange part does not become extremely small, and the inductance of the coil device does not decrease. In addition, even if an external force is applied to the flange from the first terminal electrode side or the second terminal electrode side, the flange part has a high strength capable of withstanding the force.

Further, by leading out the wire toward the concave part, it becomes possible to draw the wire obliquely on the electrode and bond the wire at the end part of the terminal electrode. Therefore, good solder wettability can be obtained except for the bonding part between the wire and the terminal electrode, the area of the electrode surface can be sufficiently large, and it becomes possible to increase the bonding strength between the coil device and the circuit board.

It is preferable that the concave part is located close to the second terminal electrode between the first terminal electrode and the second terminal electrode, and the lead-out part of the second wire extends obliquely from an outer periphery of the winding core part through the second terminal electrode toward the concave part, when viewed from the mounting surface.

With such configuration, the second wire can be bonded to the end part of the second terminal electrode. In this case, a good solder wettability can be obtained except at the bonding part between the lead-out part of the second wire and the second terminal electrode. Thus, the area of the electrode surface can be sufficiently large and the bonding strength between the coil device and the circuit board can be increased.

It is preferable that an end part of the lead-out part of the second wire is provided on the second terminal electrode close to the concave part. With such an arrangement, the second wire is arranged on the mounting surface side of the concave part when the second wire is cut. Thus, it becomes possible to cut the second wire while the cutting tool enters toward the bottom from the mounting surface of the concave part.

It is preferable that, an inclined part inclined from the outer periphery of the winding core toward the first terminal electrode is formed on the inner end surface provided opposite to the outer end surface of the flange part, the led-out part of the first wire extends along the inclined surface of the inclined part from the outer periphery of the winding core part toward the first terminal electrode, and a wall is formed between the bottom from the outer end surface of the concave part and the inclined part.

In this way, by forming the inclined part on the inner end surface, it is possible to draw out the first wire along the inclined surface of the inclined part, and no excessive load is generated on the lead-out part of the first wire. In addition, since a wall is formed between the bottom from the outer end surface of the concave part and the inclined part, the concave part and the inclined part do not communicate with each other, and when cutting the second wire, the first wire is prevented from being cut.

It is preferable that an outer shape of the flange part as viewed from the front and an outer shape of the flange part as viewed from the back substantially coincide with each other, when the core is reversed. In this way, it becomes possible to form the terminal electrode on both front and back of the flange part.

In order to achieve the above object, a coil device of the second object of the invention includes:

a core including a winding core part, a first flange part provided at an axial end part of the winding core part, and a second flange part provided at the other axial end part of the winding core part, a coil part in which a first wire and a second wire are wound around the winding core part, a first terminal electrode, formed on a mounting surface of the first flange part and connected to one lead-out part of the first wire, a second terminal electrode, formed on the mounting surface of the first flange part spaced apart from the first terminal electrode and connected to one lead-out part of the second wire, a third terminal electrode, formed on the mounting surface of the second flange part and connected to the other lead-out part of the second wire, and a fourth terminal electrode, formed on the mounting surface of the second flange part spaced apart from the third terminal electrode and connected to the other lead-out part of the first wire, in which the first flange part includes a concave part, recessed from the mounting surface of the first flange part and from an outer end surface of the first flange part in order to have bottoms.

The coil device may include:

a first inclined part of the first flange part, inclined from an outer periphery of the winding core toward the first terminal electrode and formed on an inner end surface opposite to the outer end surface of the first flange part, and a second inclined part of the second flange part, inclined from the outer periphery of the winding core toward the third terminal electrode and formed on an inner end surface opposite to an outer end surface of the second flange part, in which the one lead-out part of the first wire extends along an inclined surface of the first inclined part of the first flange part from the outer periphery of the winding core part toward the first terminal electrode, and the other lead-out part of the second wire extends along an inclined surface of the second inclined part of the second flange part from the outer periphery of the winding core part toward the third terminal electrode.

With such configuration, it becomes possible to equalize the line length of the coil composed of the first wire and the line length of the coil made of the second wire.

DESCRIPTION OF THE PREFERRED EMBODIMENTS

Hereinafter, the present invention will be described based on the embodiments shown by figures.

The First Embodiment

Figure 1A:
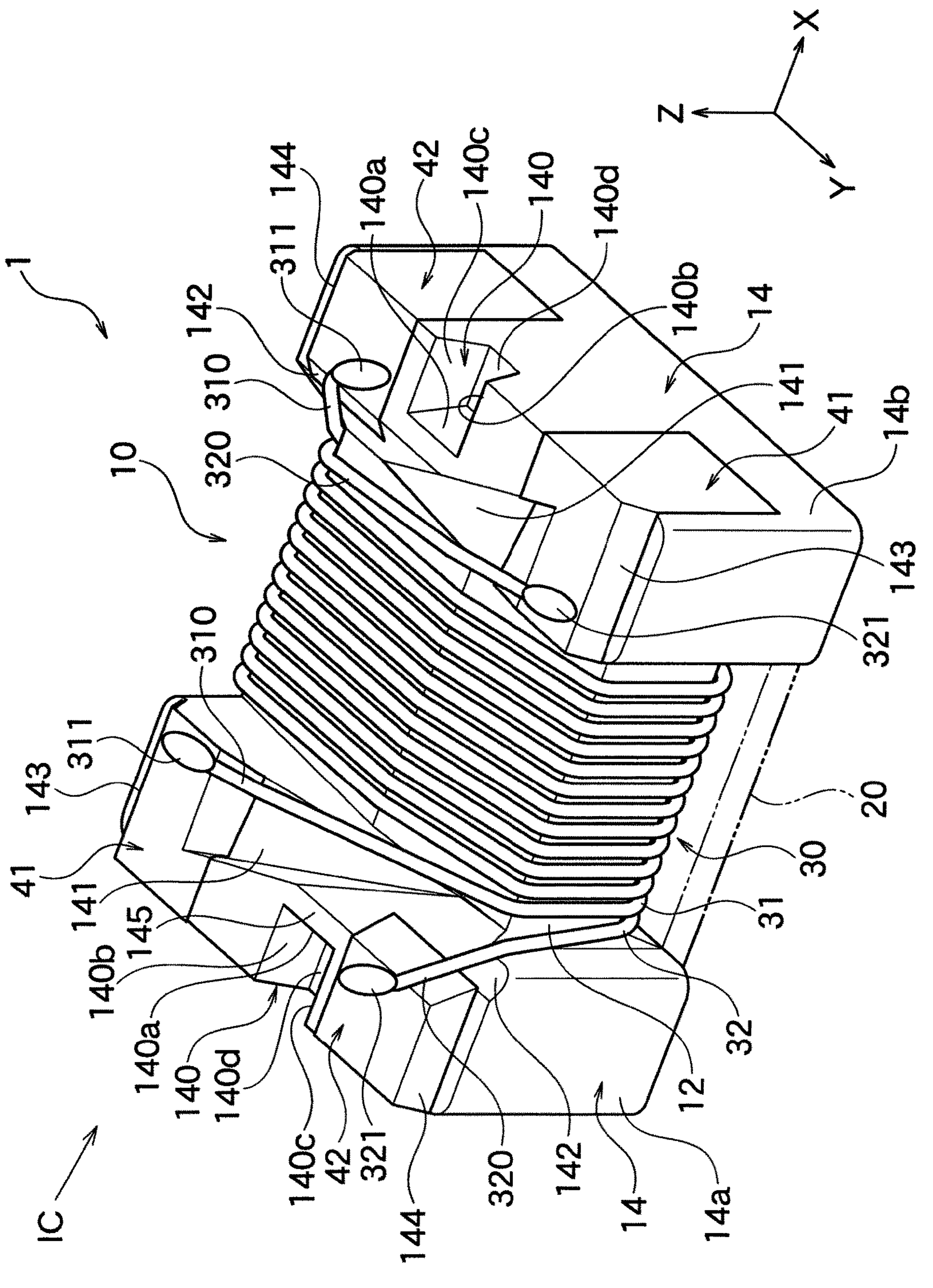
FIG. 1A is an entire perspective view of the coil device according to the first embodiment of the invention.

As shown in FIG. 1A, coil device 1 according to an embodiment of the invention includes a drum core 10 and a coil part 30, wound around a winding core part 12 of the drum core 10.

In the following description, the X axis indicates a direction parallel to the winding axis of the winding core 12 of the drum core 10 in a plane parallel to the mounting surface on which the coil device 1 is mounted. As with the X axis, the Y axis is in a plane parallel to the mounting surface and is perpendicular to the X axis. The Z axis is in normal direction to the mounting surface.

The drum core 10 has the winding core part 12 and a pair of flange parts 14*a*, 14*b* provided at both ends in the X axis direction of the winding core part 12. One of the flange parts 14*a* (the first flange part) is provided at one end of the winding core part 12 in the axial direction. The other flange part 14*b* (the second flange part) is provided at the other end of the winding core part 12 in the axial direction and faces the flange part 14*a*. In the following description, when it is unnecessary to particularly distinguish the flange parts 14 *a* and 14 *b*, they are collectively referred to as "flange part 14". The winding core part 12 has a winding axis in the X axis direction and has a substantially hexagonal cross section elongated in the Y axis direction. Each of the flange parts 14 has the same shape, but they may be different from each other. In the present embodiment, the respective flange parts 14 is provided so as to be point symmetrical to each other. Although the cross sectional shape of the winding core part 12 is substantially hexagonal in the present embodiment, it may be rectangular, circular, or substantially octagonal, and its cross sectional shape is not particularly limited.

As shown in FIG. 1A, the first wire 31 and the second wire 32 wound around the winding core part 12, and constitute the coil part 30 formed by winding one or more layers of the wires 31, 32. The wires 31, 32 are constituted by such as coated conducting wires, and have a configuration in which a core material made of a good conductor is covered with an insulating coating film. In the present embodiment, the cross sectional areas of the conductor part of the wires 31, 32 may be the same or different. Further, the coil part 30 may be formed by winding one wire in one or more layers, or may be formed by winding three or more wires in one or more layers.

In the present embodiment, although the number of turns of the wires 31 and 32 are substantially the same, they may be different depending on the use. It should be noted that "the number of turns of the wires 31 and 32 are substantially the same" refers to the ratio of the number of turns is within the range of 0.75 to 1/0.75, and preferably one.

Figure 1B:
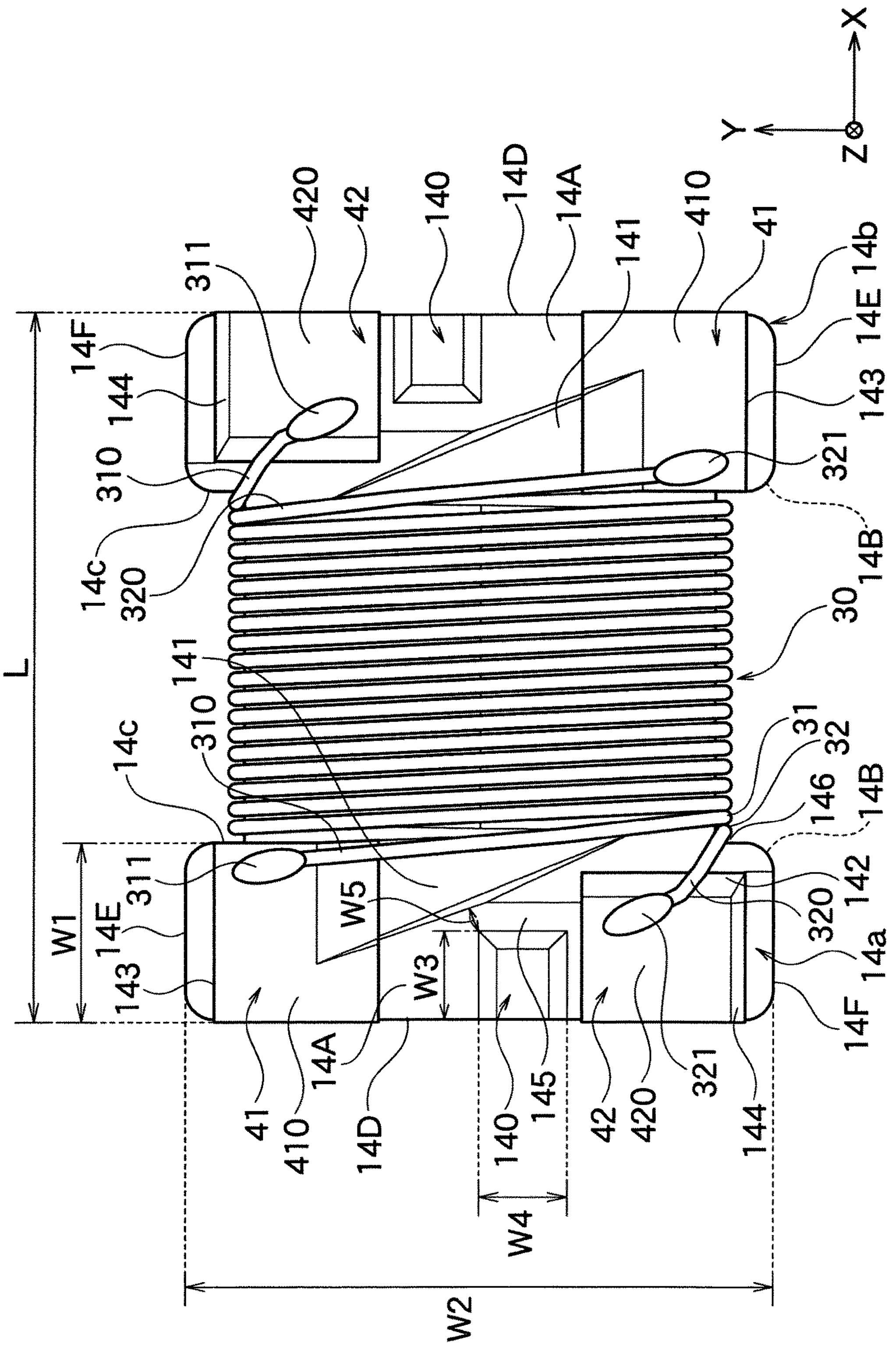
FIG. 1B is a planar view of the coil device shown in FIG. 1A.

The outer shape of each flange part 14 is a substantially rectangular parallelepiped shape (substantially rectangular shape) in the Y axis direction. And these flange parts 14 are arranged so as to be substantially parallel to each other with a predetermined interval in the X axis direction. As shown in FIG. 1B, when viewing the flange part 14 from the mounting surface side (the Z axis upper side in the present embodiment), the flange part 14 is formed so that its four corners are rounded. The cross sectional (Y-Z cross section) shape of the flange part 14 may be a circular shape or a substantially octagonal shape, and its cross sectional shape is not particularly limited.

As shown in FIG. 1B, the flange part 14 has an upper surface 14A, a lower surface 14B, an inner end surface 14C, an outer end surface 14D, the first lateral side surface 14E, and the second lateral side surface 14F. The upper surface 14A is a surface on the upper side of the flange part 14. The lower surface 14B is a surface opposite to the upper surface 14A. The inner end surface 14C is a surface on the winding core part 12 side. The outer end surface 14D is a surface opposite to the inner end surface 14C. The first lateral side surface 14E is orthogonal to the upper surface 14A and the inner end surface 14C, and is on the side of the first terminal electrode 41 described later. The second lateral side surface 14F is perpendicular to the upper surface 14A and the inner end surface 14C and is the face on the side of the second terminal electrode 42.

In the present embodiment, the upper surface 14A becomes the mounting surface (a ground surface) when the coil device 1 is mounted on such as a circuit board. In the illustrated example, the second lateral side surface 14F of one flange part 14 flushes with the first lateral side surface 14E of the other flange part 14. However, there may be a deviation in Y axis direction between the lateral side surfaces 14E and 14F.

Figure 1C:
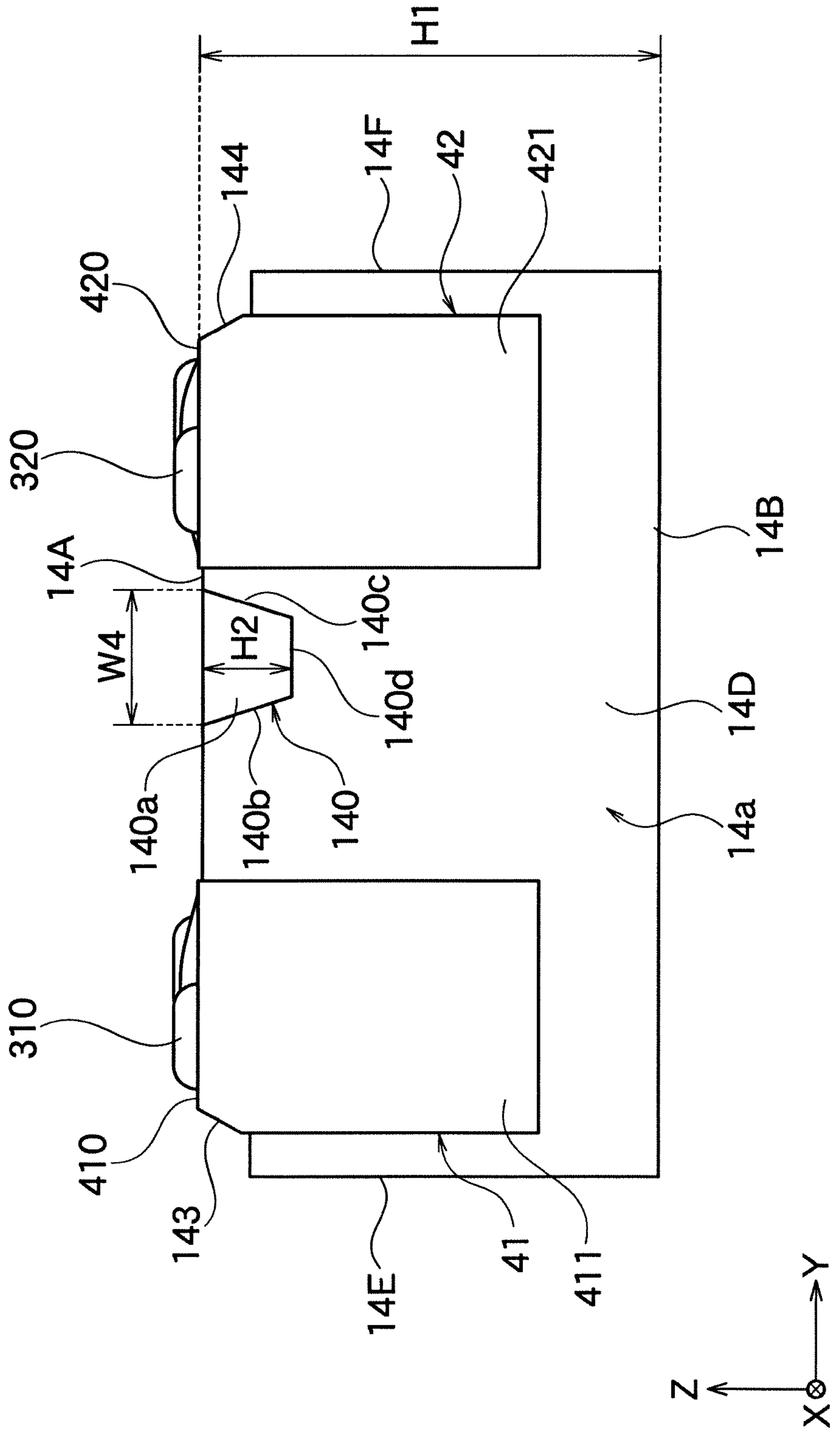
FIG. 1C is a side view of the coil device shown in FIG. 1A, viewed from the direction of 1C.

The first terminal electrode 41 is formed on the upper surface 14A (the mounting surface) of the flange part 14. The first terminal electrode 41 formed on the first flange part 14*a* and the first terminal electrode (the third terminal electrode) 41 formed on the second flange part 14*b* have the same configuration. As shown in FIG. 1B and FIG. 1C, according to the present embodiment, the first terminal electrode 41 includes the first upper surface electrode part 410 and the first side surface electrode part 411, which are electrically connected. More specifically, the first upper surface electrode part 410 is parallel to the X-Y plane and is formed at one end of the upper surface 14A of the flange part 14 in the Y axis direction. A part of the first upper surface electrode part 410 also extends to the first inclined part 141 described later. The first side surface electrode part 411 is a surface parallel to the Y-Z plane and is formed on the end surface 14D of the flange part 14. By forming the first side surface electrode part 411 on the flange part 14, it is possible to form a sufficient solder fillet on the first terminal electrode 41.

The first connecting part 311, which is a connecting part of the first wire 31 with the lead-out part 310, is formed in the first upper electrode part 410 formed on the first flange part 14*a*. A first connecting part 321, which is a connecting part of the second wire 32 to the lead-out part 320, is formed on the first upper surface electrode part 410 formed on the second flange part 14*b*. The connection parts 311, 321 are formed by thermocompression bonding the lead-out parts 310, 320 to the first upper surface electrode part 410. In the present embodiment, the first upper surface electrode parts 410 and 420 also function as a mounting part that is connected to face the circuit board (not shown). More specifically, a part of the first upper surface electrode parts 410, 420 where the first connecting parts 311, 321 are not formed functions as a good bonding surface of solder with electrodes (lands) of the circuit board.

In general, the solder wettability decreases at the thermocompression bonded part. Therefore, it is preferable that the first connecting parts 311, 321 are preferably provided at the end, and but not in the central part of the first upper surface electrode parts 410, 420. Thereby, it is possible to ensure a sufficiently large area of the first upper surface electrode part 410, 420 having excellent solder wettability, to increase the bonding strength (fixing strength) between the coil device and the circuit substrate. In addition, even when the coil device 1 is downsized, it is possible to sufficiently secure the fixing strength with the circuit board.

On the upper surface 14A (the mounting surface) of the flange part 14, the second terminal electrode 42 is formed at a predetermined interval (spaced apart) from the first terminal electrode 41 along the Y axis direction. The second terminal electrode 42 formed in the first flange part 14*a* and the second terminal electrode (the fourth terminal electrode) 42 formed in the second flange part 14*b* have the same configuration. The distance between the first terminal electrode 41 and the second terminal electrode 42 is not particularly limited as long as insulation is secured.

According to the present embodiment, the second terminal electrode 42 includes the second upper surface electrode part 420 and the second side surface electrode part 421, which are electrically connected. More specifically, the second upper surface electrode part 420 is parallel to the X-Y plane and is formed at one end of the upper surface 14A of the flange part 14 in the Y axis direction. A part of the second upper surface electrode part 420 also extends to the second inclined part 142 and the third inclined part described later. The second side surface electrode part 421 is a surface parallel to the Y-Z plane and is formed on the end surface 14D of the flange part 14. By forming the first side surface electrode part 411 on the flange part 14, it is possible to form the sufficient solder fillet on the second terminal electrode 42.

The second upper surface electrode part 420 formed on the first flange part 14*a* is formed with the second connecting wire part 321 which is the connecting part with the lead out part 320 of the second wire 32. The second upper surface electrode part 420 formed on the second flange part 14*b* is formed with the first connecting part 311 which is a connecting part of the first wire 31 with the lead-out part 310. The connection parts 311, 321 are formed by thermocompression bonding the lead-out parts 310, 320 to the second upper surface electrode part 420. In the present embodiment, the second upper surface electrode part 420 also functions as the mounting part that is connected to be opposed to the surface of the circuit board (not shown). More specifically, the part of the second upper surface electrode part 420 where the connecting parts 311 and 321 are not formed functions as a good bonding surface of the solder to the electrode (land) of the circuit board.

Note that it is preferable that the connecting parts 311 and 321 are provided not at the center but on the end part of the second upper surface electrode part 420. Thereby, it becomes possible to secure a sufficiently large area, where it is excellent in solder wettability. And it is possible to increase the fixing strength between the coil device and the circuit board. In addition, even when the coil device 1 is downsized, it is possible to sufficiently secure the fixing strength with the circuit board.

Figure 2A:
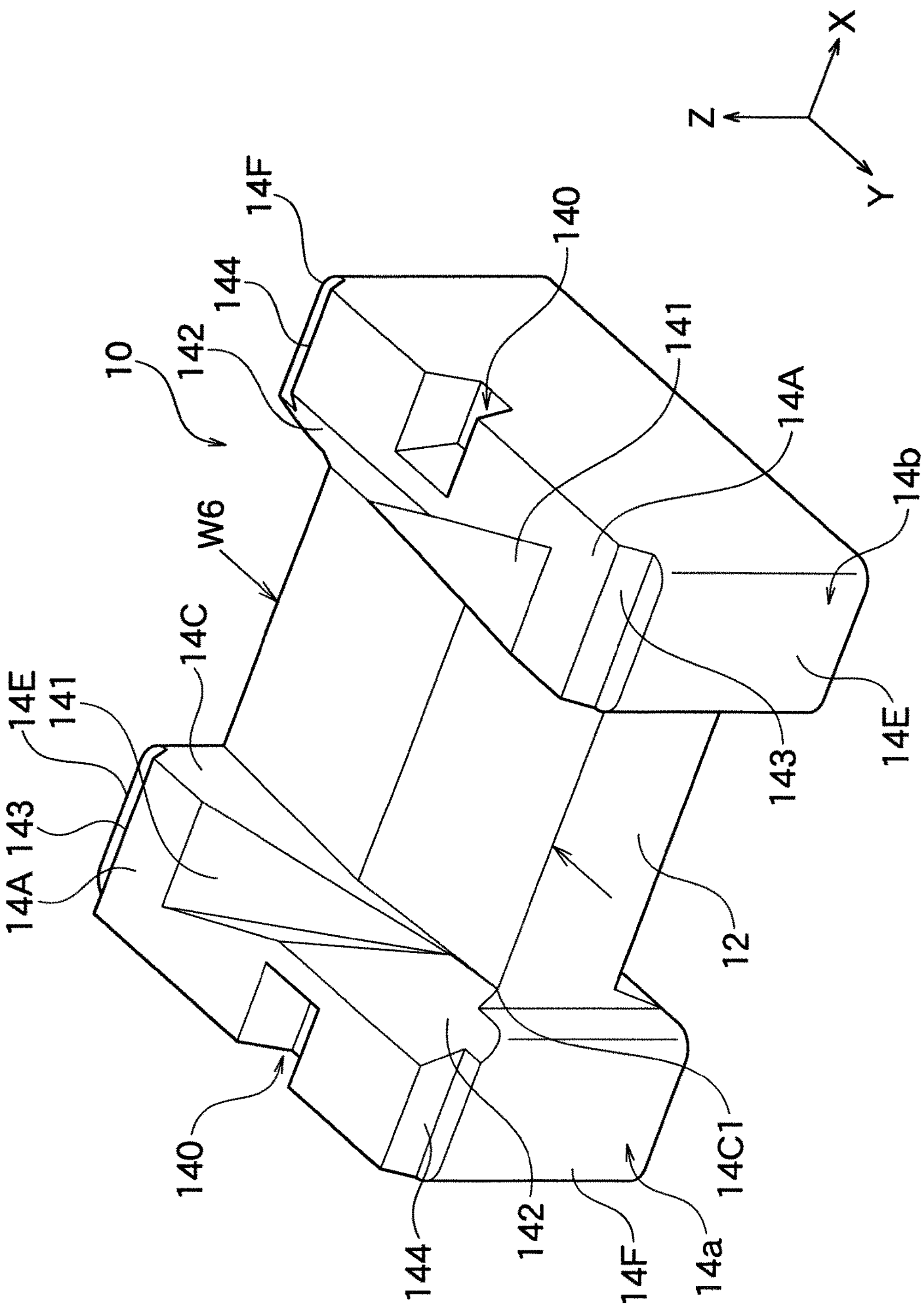
FIG. 2A is a perspective view showing the producing steps of the coil device shown in FIG. 1A.

On the inner end surface 14C positioned opposite to the outer end surface 14D of the first flange part 14*a*, the first inclined part (the first inclined part of the first flange part) 141 inclined from the outer periphery (the outer periphery on the side of second terminal electrode 42) of the winding core part 12 (the first flange part side inclined part) is formed. Similarly, on the inner end surface 14C positioned opposite to the outer end surface 14D of the second flange part 14*b*, the first inclined part (the first inclined part of the second flange part) 141 inclined from the outer periphery (the outer periphery on the side of the second terminal electrode 42) of the winding core part 12 (a first flange part side inclined part) is formed. As shown in FIG. 2A, the first inclined part 141 is inclined so as to gradually descend from the first terminal electrode 41 side toward the second terminal electrode 42 side. The first inclined part 141 is formed in a range between the intersection line 14C1, formed by the inner end surface 14C and the outer periphery of the winding core part 12, and the upper surface 14A.

When viewed from the upper surface 14 side, the first inclined part 141 has an outer shape of a substantially triangular shape (approximately right triangle in the illustrated example), and gradually narrows toward the second terminal electrode 42 side. In the present embodiment, the lead-out part 310 of the first wire 31 extends obliquely from the outer periphery of the winding core part 12 toward the first terminal electrode 41 of the first flange part 14*a* along the inclined surface of the first inclined part 141. The lead-out part 320 of the second wire 32 extends obliquely from the outer periphery of the winding core part 12 toward the first terminal electrode 41 of the second flange part 14*b* along the inclined surface of the first inclined part 141.

As shown in FIGS. 1A and 1B, the second inclined part 142 is formed on the inner end surface 14C of the flange part 14. The second inclined part 142 is inclined so as to gradually descend toward the winding core part 12 along the X axis direction. The second inclined part 142 is formed in a range between the intersection line 14C1 formed by the inner end surface 14C and the outer periphery of the winding core part 12 and the upper surface 14A.

In the present embodiment, the lead-out part 320 of the second wire 32 extends obliquely from the outer periphery of the winding core part 12 toward the second terminal electrode 42 of the first flange part 14*a* along the inclined surface of the second inclined part 142. Further, the lead-out part 310 of the first wire 31 extends obliquely from the outer periphery of the winding core part 12 toward the second terminal electrode 42 of the second flange part 14*b* along the inclined surface of the second inclined part 142. Therefore, it is preferable that the lead-out parts 310 and 320 pass through the end part of the second terminal electrode 42 and sufficiently secure the area of the second upper surface electrode part 420 having excellent solder wettability as described above.

The third inclined part 143 is formed on the first lateral side surface 14E of the flange part 14. The third inclined part 143 is inclined so as to gradually descend toward the outer side of the flange part 14 along the Y axis direction.

A fourth inclined part 144 is formed on the second lateral side surface 14F of the flange part 14. The fourth inclined part 144 is inclined so as to gradually descend toward the outside of the flange part 14 along the Y axis direction.

As shown in FIG. 2A, on the inner end surface 14C of the flange part 14, a step part 146 is formed at the bonding part with the winding core part 12. The step part 146 is used as a passage for smoothly leading out the lead-out parts 310, 320 of the wires 31, 32 to the second upper electrode part 420 of the second terminal electrode 42.

As shown in FIGS. 1A and 1B, the flange part 14 has the concave part 140 recessed from the mounting surface (the upper surface 14A) of the flange part and from an outer end surface of the flange part in order to have bottoms. That is, the concave part 140 (groove) for opening the upper surface 14A side and the outer end surface 14D side of the flange part 14 is formed at the corner part between the upper surface 14A and the outer end surface 14D of the flange part 14.

The concave part 140 has a first side wall 140*a*, a second side wall 140*b*, a third side wall 140*c*, and a fourth side wall 140*d*. The first side wall 140*a* is a side wall on the side opposite to the inner end surface 14C and corresponds to the bottom from the outer end surface 14D of the concave part 140. The second side wall 140*b* is a side wall on the side opposite to the first lateral end surface 14E. The third side wall 140*c* is a side wall on the side opposite to the second lateral end surface 14F and is on the side opposite to the second side wall 140*b*. The fourth side wall 140*d* is a side wall on the side opposite to the inner end surface 14C and corresponds to the bottom from the upper surface (mounting surface) 14A of the concave part 140.

In the present embodiment, the concave part 140 is located between the first terminal electrode 41 and the second terminal electrode 42. In the present embodiment, the concave part 140 is provided closer to the second terminal electrode 42 than the first terminal electrode 41. A gap of a predetermined length is formed between the concave part 140 and the second terminal electrode 42. The gap may be omitted.

With such arrangement, the lead-out parts 310, 320 of the wires 31, 32 obliquely extends from the outer circumference (more precisely, the step part 146) of the winding core part 12, through the inclined surface of the second inclined part 142 and the second terminal electrode 42 (more precisely, the end part of the second terminal electrode 42 in the X axis direction), and toward the concave part 140, when viewed from the upper surface (the mounting surface) 14A side. End parts of the lead-out parts 310 and 320 of the wires 31 and 32 are provided on the second terminal electrode 42 near the concave part 140 (near the third side wall 140 *c*).

As shown in FIG. 1B, the concave part 140 has a substantially square shape when viewed from the upper surface 14A side. However, the shape of the concave part 140 is not limited thereto, and may be, for example, a substantially rectangular shape or a substantially circular shape when viewed from the upper surface 14A side.

As shown in FIG. 1B, the first side wall 140 *a*, the second side wall 140 *b*, and the third side wall 140 *c* of the concave part 140 are tapered surfaces, respectively. And as shown in FIG. 1C, the width in the X axis direction and the width in the Y axis direction gets narrower as the upper surface 14A gets closer to the lower surface 14B at the concave part 140. Note that the first side wall 140*a*, the second side wall 140*b*, and the third side wall 140*c* of the concave part 140 may be surfaces perpendicular to the upper surface 14A.

As shown in FIG. 1A, a wall 145 is formed between the first side wall 140*a* (the bottom from the outer end surface 14D) and the first inclined part 141, respectively of the concave part 140. The wall 145 connects the first terminal electrode 41 side and the second terminal electrode 42 side of the concave part 140 along the Y axis direction. Therefore, a region of the height H1 (see FIG. 1C) is formed continuously through the wall 145 between the first terminal electrode 41 side and the second terminal electrode 42 side having the concave part 140 in between.

The first terminal electrode 41 and the second terminal electrode 42 are composed such as of a metal paste baking film or a metal plating film. For the terminal electrodes 41 and 42, for example, Ag paste is applied to the surfaces of the upper surface 14A and the outer end surface 14D of the flange part 14 and baked thereof, and then the surface is subjected to, for example, electrolytic plating or electroless plating to form a plating film.

The material of the metal paste is not particularly limited, and examples thereof include Cu paste and Ag paste. Further, the plating film may be a single layer or a multiple layer, and plating films such as Cu plating, Ni plating, Sn plating, Ni—Sn plating, Cu—Ni—Sn plating, Ni—Au plating, Au plating and the like are exemplified. The thickness of the terminal electrodes 41 and 42 is not particularly limited, but it is preferably 0.1 to 15 μm.

In manufacturing the coil device 1, first, the drum core 10 and the wires 31, 32 are prepared. As the wires 31 and 32, for example, a core material made of a good conductor such as copper (Cu) is covered with an insulating material such as imide-modified polyurethane and the outermost surface is covered with a thin resin film such as polyester can be used.

As the magnetic material constituting the drum core 10, for example, a magnetic material having a relatively high magnetic permeability such as a Ni—Zn based ferrite, an Mn—Zn based ferrite, a metal magnetic material, or the like is exemplified. These magnetic material powders are pressed and sintered, whereby the drum core 10 is produced. At that time, as shown in FIG. 2A, in the drum core 10, the recessed part 140, the first inclined part 141, the second inclined part 142, the third inclined part 143, and the fourth inclined part 144 are integrally formed in each part of the flange part 14. Further, in the drum core 10, the winding core part 12 and the pair of flange parts 14 are integrally formed.

Figure 2B:
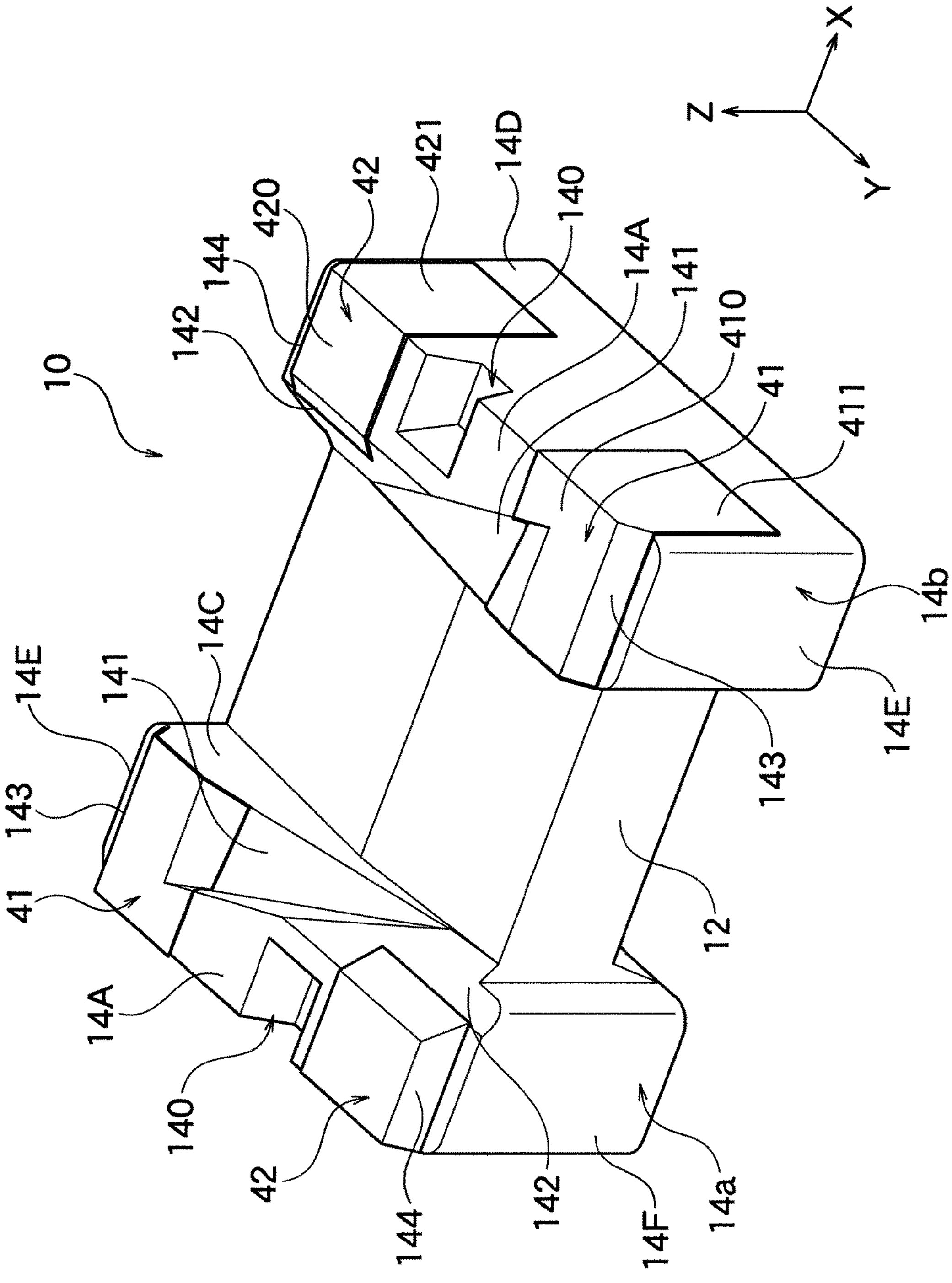
FIG. 2B is a perspective view showing a subsequent step of FIG. 2A.

Next, a metal paste is applied to the flange part 14 of the drum core 10 and baked thereof at a predetermined temperature. Then, by applying electrolytic plating or electroless plating on the surface thereof, the first terminal electrode 41 and the second terminal electrode 42 as shown in FIG. 2B are formed.

Figure 2C:
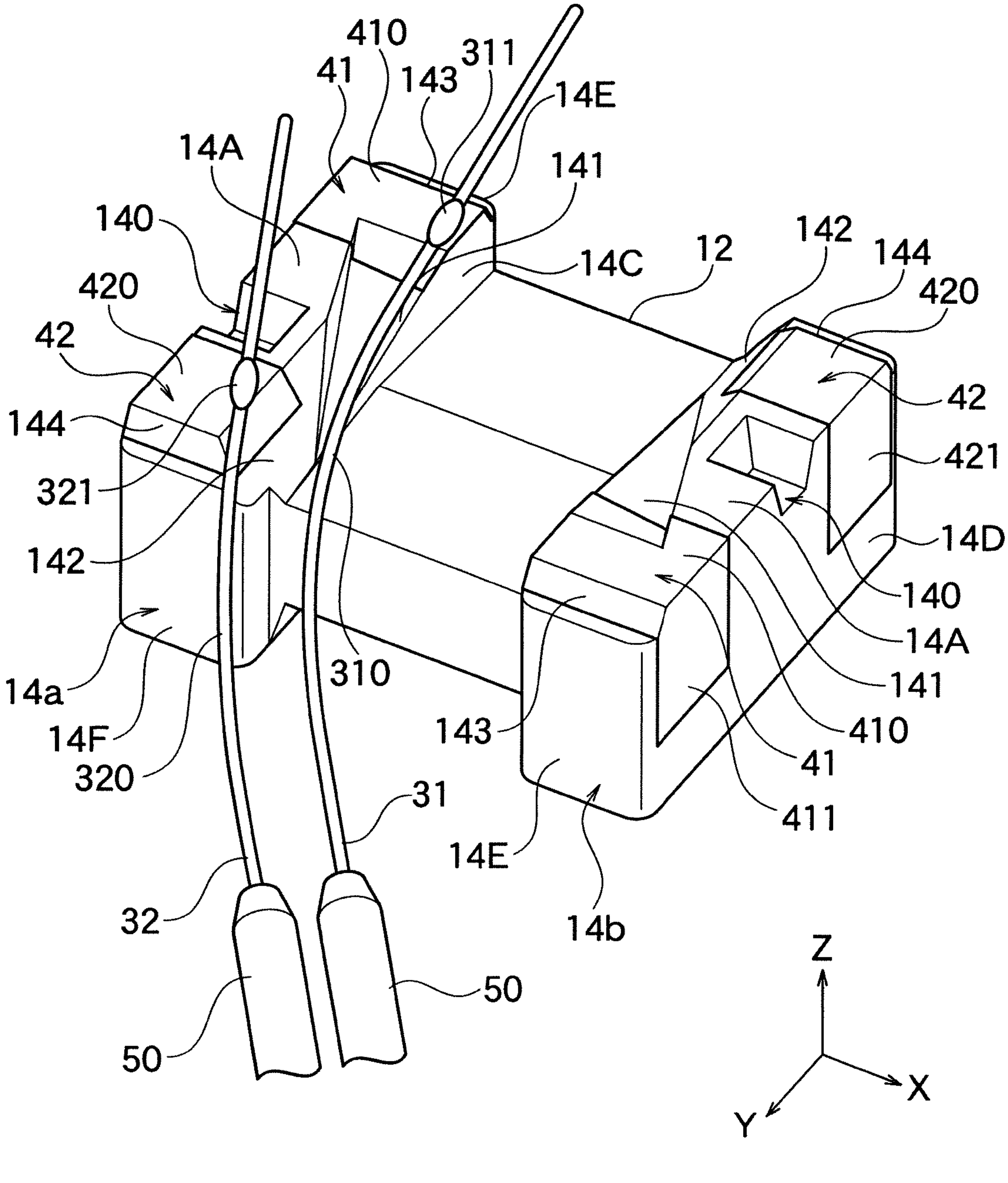
FIG. 2C is a perspective view showing a subsequent step of FIG. 2B.

Next, the drum core 10 and the wires 31, 32 on which the terminal electrodes 41, 42 are formed are set at a winding machine (not shown). And as shown in FIG. 2C, the first wire 31 (lead-out part 310) is lead out from the tip of the nozzle 50 and connected to the first upper surface electrode part 410 of the first terminal electrode 41. As a result, the first connecting part 311 is formed at the connecting part between the first upper electrode part 410 and the first wire 31.

Similarly, the second wire 32 (the lead-out part 320) is drawn out from the tip of the nozzle 50 and connected to the second upper electrode part 420 of the second terminal electrode 42. As a result, the second connecting part 321 is formed at the connecting part between the second upper surface electrode part 420 and the second wire 32.

A method for the connection is not particularly limited. For example, a heater chip is pressed so as to sandwich the wire 31 or 32 between itself and the terminal electrode 41 or 42, and the wires 31, 32 are thermocompression bonded. Since the insulating material covering the core wires of the wires 31 and 32 is melted by heat during thermocompression bonding, it is not necessary to remove the coating on the wires 31 and 32.

Figure 2D:
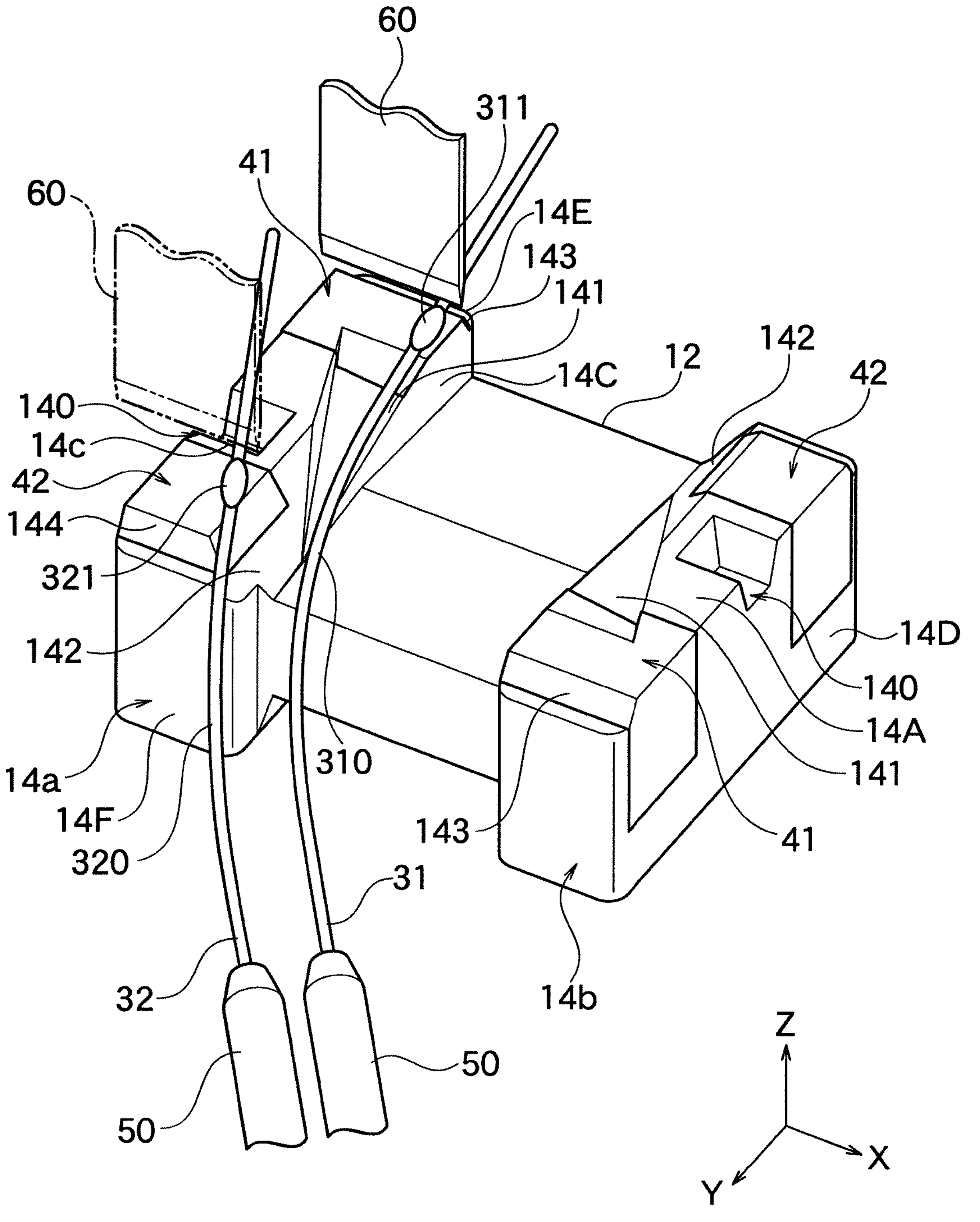
FIG. 2D is a perspective view showing a subsequent step of FIG. 2C.

Next, as shown in FIG. 2D, an unnecessary part of the first wire 31 (the lead-out part 310) protruding from the first upper surface electrode part 410 (the first terminal electrode 41) is cut by the cutting tool 60. When the unnecessary part of the lead-out part 310 is cut, the cut part of the lead-out part 310 is provided around the third inclined part 143, and the cutting tool 60 is placed (located) so that its side surface substantially flushes with the first lateral side surface 14E.

Then, at that position, the cutting tool 60 is lowered along the first lateral side surface 14E in the Z axis direction. As a result, it is possible to cut the cut part of the lead-out part 310 without bringing the cutting tool 60 into contact with the corner part of the upper surface 14A and the first lateral side surface 14E respectively of the flange part 14, and the flange part 14 can be prevented from being damaged.

Similarly, an unnecessary part of the second wire 32 (the lead-out part 320) protruding from the second upper surface electrode part 420 (the second terminal electrode 42) is cut by the cutting tool 60. At the time of cutting the unnecessary part of the lead-out part 320, the cut part of the lead-out part 320 is arranged on the mounting surface side of the recessed part 140 and at least a part of the cutting tool 60 is provided (positioned) above the upper surface 14A of the flange part 14, such that the side surface thereof substantially flushes with the third side wall 140*c*.

Then, at that position, the cutting tool 60 is lowered in the Z axis direction along the third side wall 14*c* toward the fourth side wall 140*d*. At this time, at least a part of the cutting tool 60 enters the inside of the concave part 140 from the outside of the concave part 140, cuts the cut part of the lead-out part 320 on the mounting surface side of the concave part 140, then enters the inside of the concave part 140 as it is. Therefore, it is possible to cut the cut part of the lead-out part 320 without bringing the cutting tool 60 into contact with the upper surface 14A of the flange part 14, preventing the flange part 14 from being damaged.

Figure 2E:
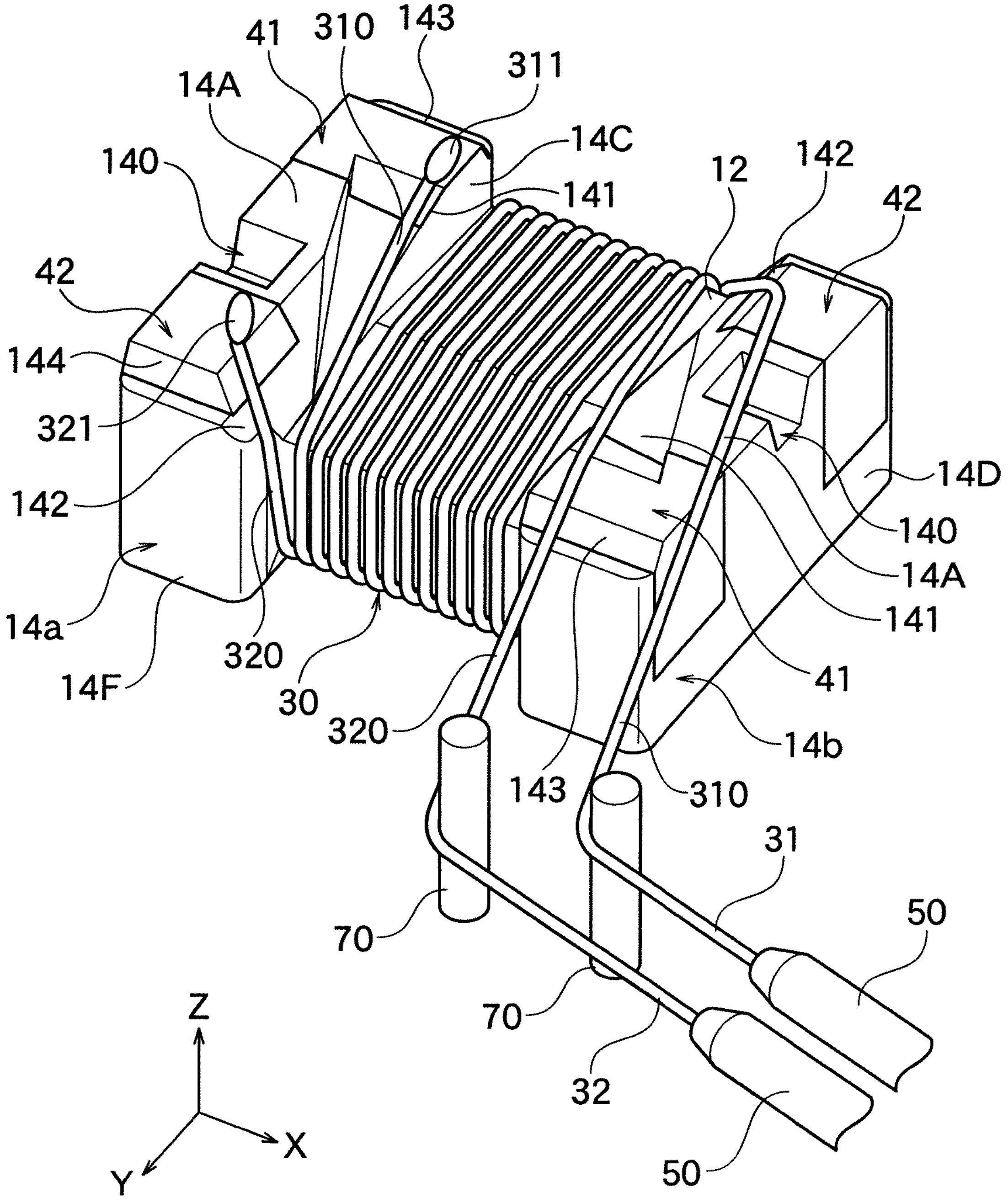
FIG. 2E is a perspective view showing a subsequent step of FIG. 2D.

Next, as shown in FIG. 2E, the first wire 31 (the lead-out part 310) is drawn obliquely to the outer periphery of the winding core part 12 along the inclined surface of the first inclined part 141 and wound around the winding core part 12. Similarly, the second wire 32 (the lead-out part 320) is drawn obliquely to the outer periphery of the winding core part 12 along the inclined surface of the second inclined part 420 and wound around the winding core part 12 to form the coil part 30. Then, the wires 31, 32 (the lead-out parts 310, 320) are obliquely drawn from the outer periphery of the winding core part 12 so as to pass through the connecting parts 420, 410 of the terminal electrodes 42, 41, and hooked and fixed to each pole 70 so as not to slack.

Figure 2F:
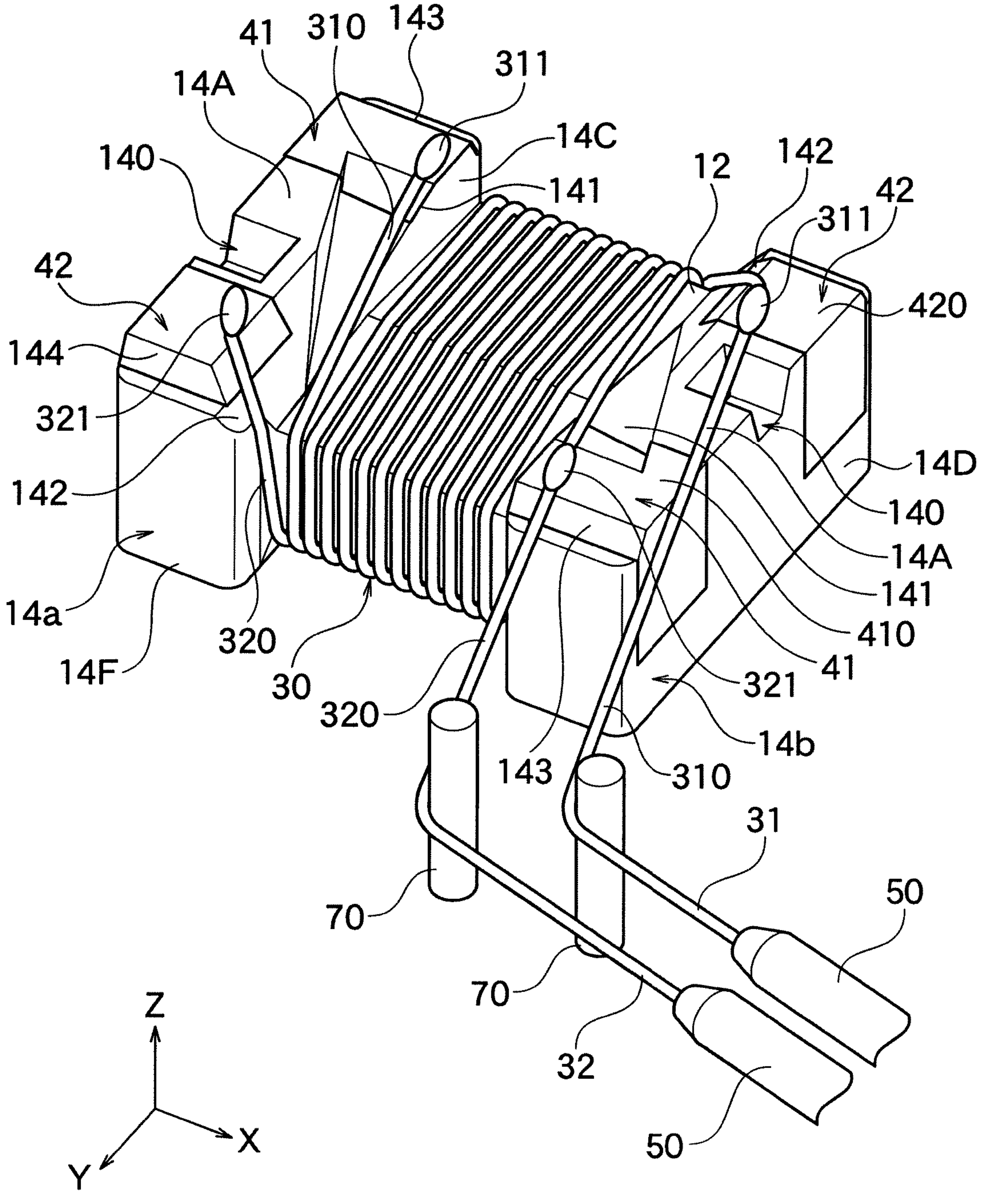
FIG. 2F is a perspective view showing a subsequent step of FIG. 2E.

Next, as shown in FIG. 2F, the first wire 31 is connected to the second upper surface electrode part 420 of the second terminal electrode 42. As a result, the first connecting part 311 is formed at a connecting part between the second upper surface electrode part 420 and the first wire 31.

Similarly, the second wire 32 is connected to the first upper surface electrode part 410 of the first terminal electrode 41. As a result, a second connecting part 321 is formed at the connecting part between the first upper surface electrode part 410 and the second wire 32.

Figure 2G:
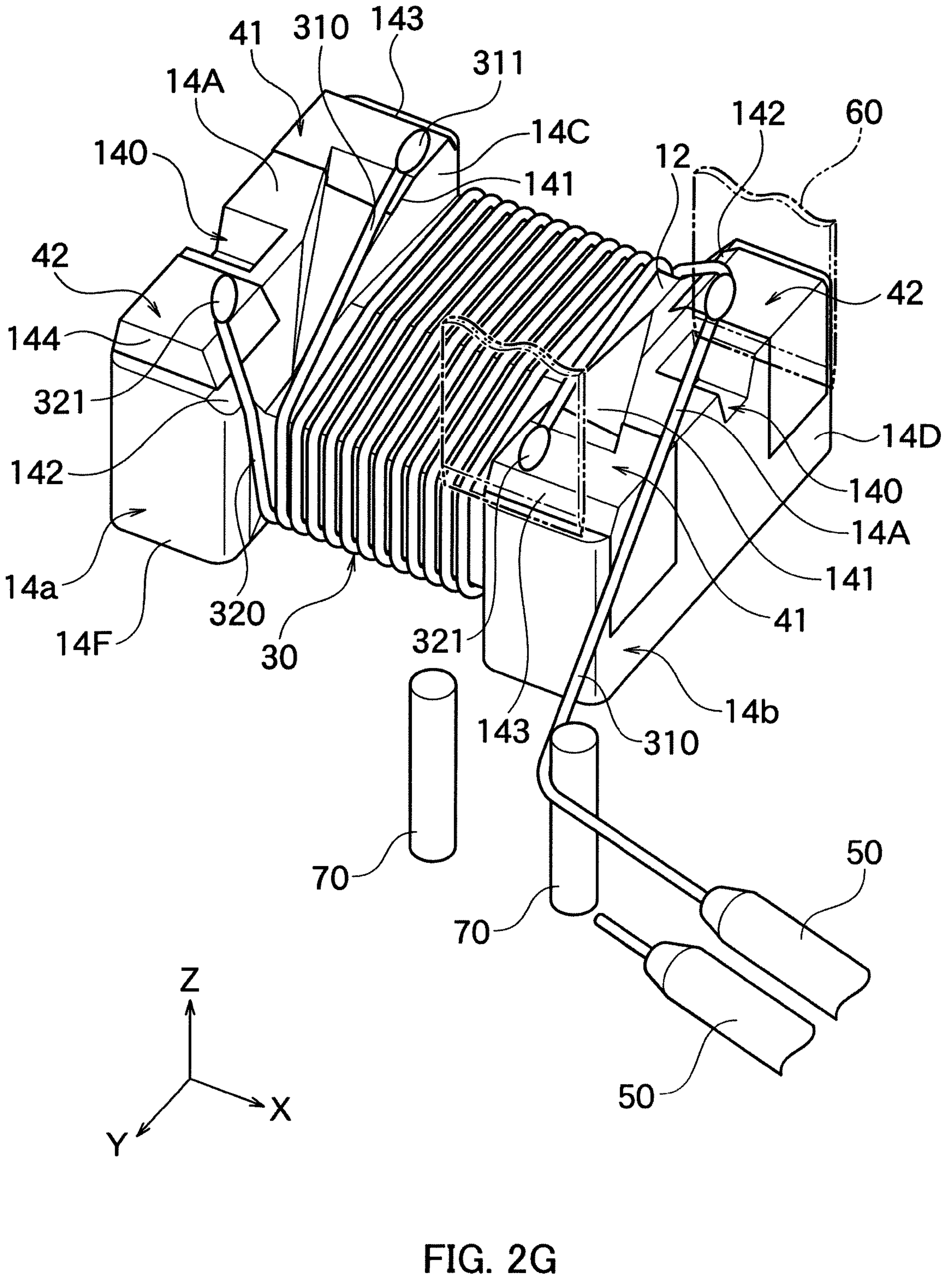
FIG. 2G is a perspective view showing a subsequent step of FIG. 2F.

Next, as shown in FIG. 2G, unnecessary parts of the first wires 31 (the lead-out part 310) protruding from the second upper surface electrode part 420 (the second terminal electrode 42) are cut in the same manner as described in FIG. 2D with the cutting tool 60. Similarly, unnecessary parts of the second wire 32 (the lead-out part 320) protruding from the first upper surface electrode part 410 (the first terminal electrode 41) is cut by the cutting tool 60.

Figure 2H:
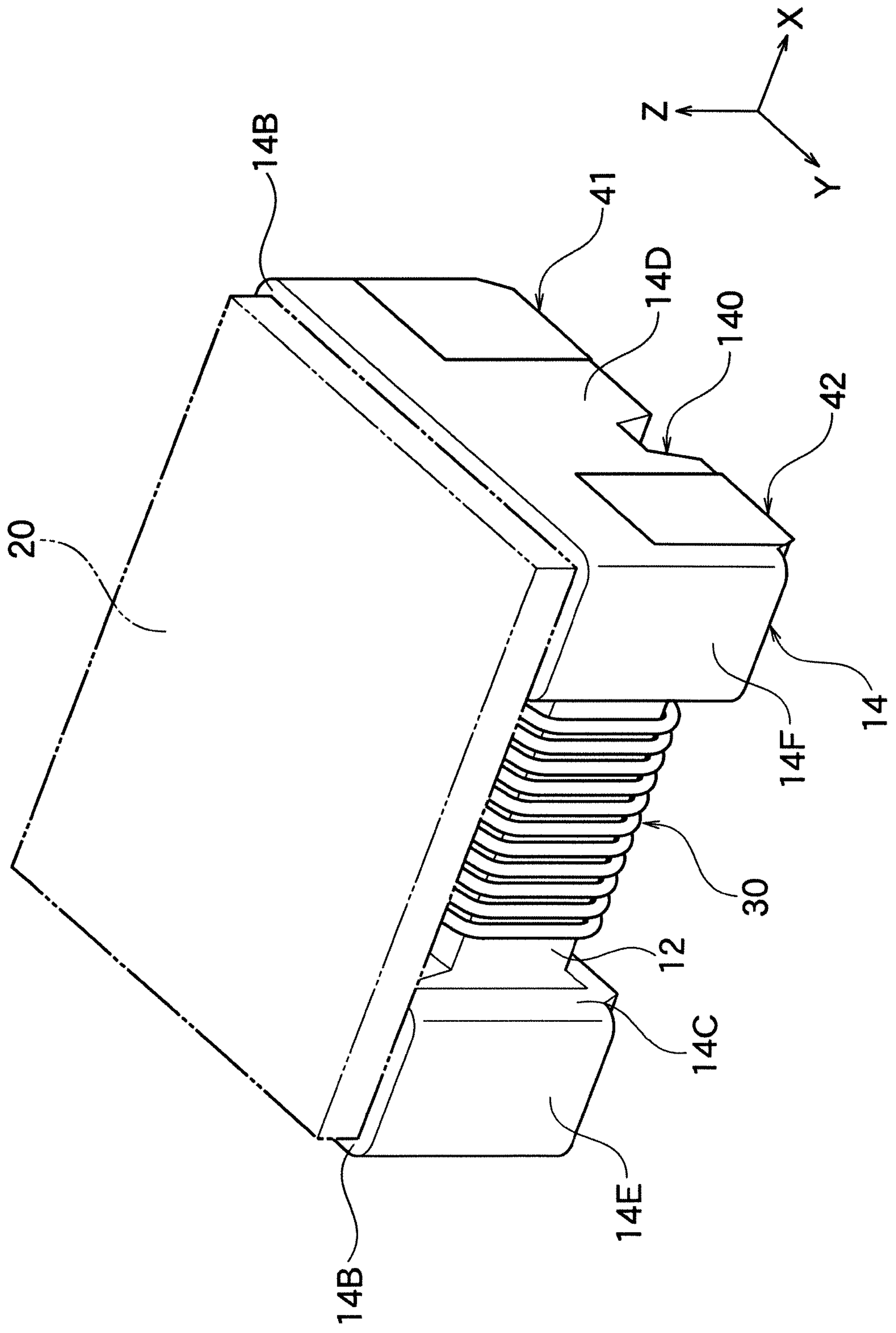
FIG. 2H is a perspective view showing a subsequent step of FIG. 2G.

Next, as shown in FIG. 2H, the plate-shaped core 20 is placed on the lower surface 14B of the flange part 14. The lower surface 14B is formed of a flat surface, and it is easy to install the plate-shaped core 20. The plate-shaped core 20 is a flat rectangular parallelepiped having a flat surface, and has a function of increasing the inductance of the coil device 1. The plate-shaped core 20 is preferably composed of the same magnetic member as the drum core 10, but it may be composed of separate members. The plate-shaped core 20 is not necessarily made of a magnetic material and may be made of a non-magnetic material such as a synthetic resin.

In the present embodiment, the flange part 14 is formed with the concave part 140 that is recessed so that the bottom remains from the upper surface (mounting surface) 14A and the outer end surface 14D of the flange part 14. Therefore, at the time of cutting after connecting the second wire 32, for example, the cut point of the second wire 32 is provided on the side respectively of the upper surface 14A of the concave part 140, and the cutting tool is moved toward the bottom from the upper surface 14A of the concave part 140.

Further, in the present embodiment, the concave part 140 is recessed so that the bottom remains from the outer end surface 14D, and is not formed so as to extend to the inner end surface 14C. Therefore, the outer end surface 14D of the flange part 14 and the inner end surface 14C do not communicate with each other and are partitioned by the wall 145. Therefore, it is possible to prevent erroneously cutting the first wire 31 when cutting the second wire 32.

Further, with the above-described configuration, even if the concave part 140 is formed in the flange part 14, the volume of the flange part 14 does not become extremely small, and the inductance of the coil device 1 never decreases. Even if an external force is applied to the flange part 14 from the first terminal electrode 31 side or the second terminal electrode 32 side, the flange part 14 has a high strength capable of withstanding thereof is provided.

In the present embodiment, the concave part 140 is provided close to the second terminal electrode 42 between the first terminal electrode 41 and the second terminal electrode 42. And the lead-out part 320 of the second wire 32 extends obliquely from the outer periphery of the winding core part 12 through the second terminal electrode 42 toward the concave part 140, when viewed from the upper surface 14 A side.

That is, in the present embodiment, by pulling the second wire 32 toward the concave part 140, the second wire 32 is drawn obliquely on the second terminal electrode 42, and it becomes possible to bond the second wires 32 to the end of the second terminal electrode 42. Therefore, a good solder wettability can be obtained except for the second connecting part 321 which is the bonding part between the second wire 32 and the second terminal electrode 42, and the area of the surface of the second terminal electrode 42 is sufficiently large. Thus, it is possible to increase the bonding strength between the coil device 1 and the circuit board.

Further, in the present embodiment, the end part of the lead-out part 320 of the second wire 32 is provided on the second terminal electrode 42 close to the concave part 140. With such an arrangement, when cutting the second wire 32, the second wire 32 is arranged on the concave part 140 at the upper surface 14A side so that the second wire 32 can be cut by allowing the cutting tool to enter from the upper surface 14A of the concave part 140 toward the bottom.

In the present embodiment, the first inclined part 141 inclined from the outer periphery of the winding core part 12 toward the first terminal electrode 42 is formed on the inner end surface 14C positioned opposite to the outer end surface 14D of the flange part 14. The lead-out part 310 of the first wire 32 extends along the inclined surface of the first inclined part 141 from the outer periphery of the core part 12 toward the first terminal electrode 41, and the wall 145 is formed between the bottom of the outer end surface 14D of the concave part 140 and the first inclined part 141.

By thus forming the first inclined part 141 on the inner end surface 14C, the first wire 32 can be lead out along the inclined surface of the first inclined part 141. Thus, an excessive load does not generate at the lead-out part 310 of the first wire 31. Further, since a wall is formed between the bottom from the outer end surface 14D of the concave part 140 and the first inclined part 141, the concave part 140 and the first inclined part 141 are not communicated with each other, and it is possible to prevent erroneously cutting the first wire 31 at the time of cutting the wire 32.

The Second Embodiment

Figure 3A:
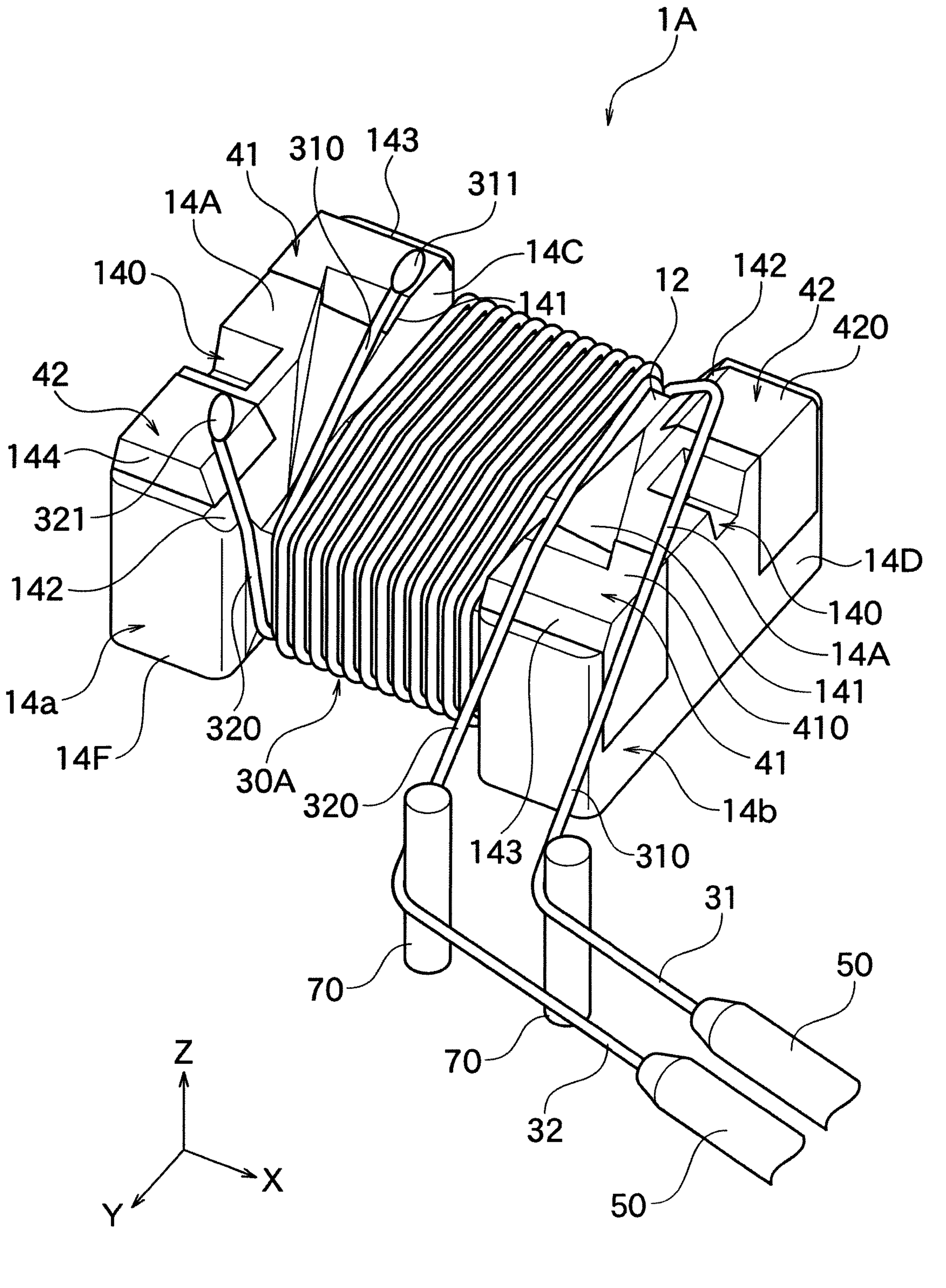
FIG. 3A is another perspective view showing the producing steps of the coil device according to the second embodiment of the present invention.
Figure 3B:
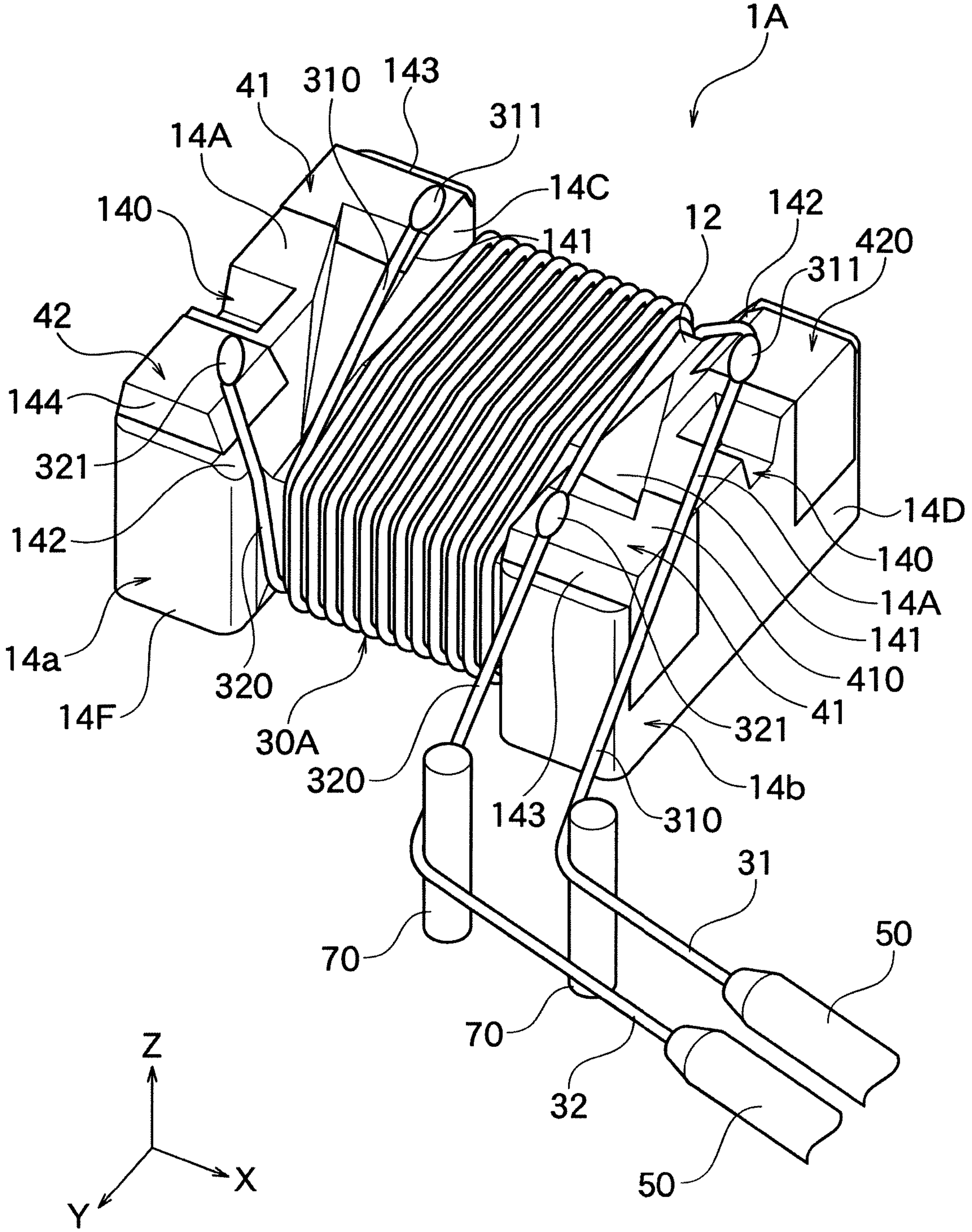
FIG. 3B is a perspective view showing a subsequent step of FIG. 3A.
Figure 3C:
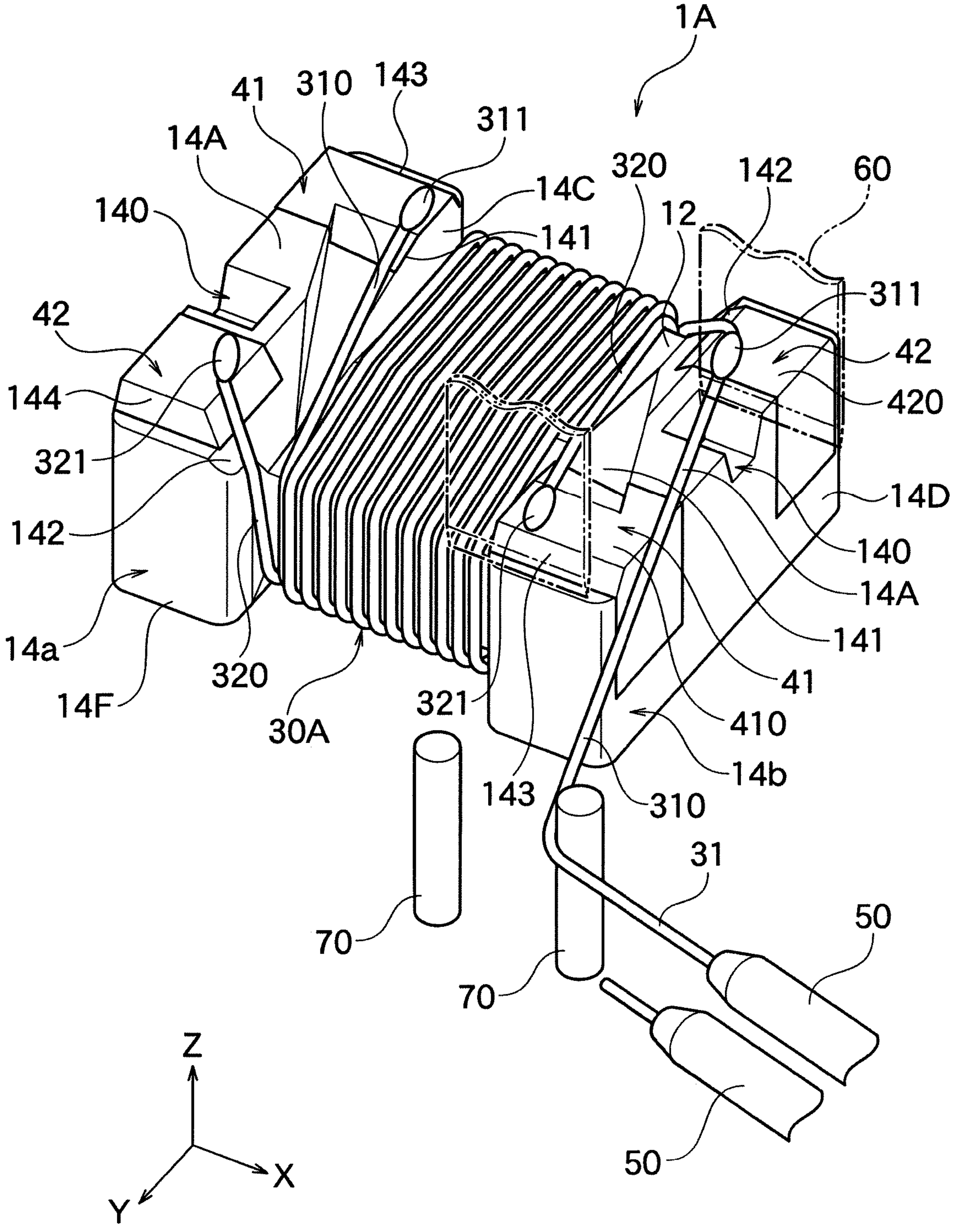
FIG. 3C is a perspective view showing a subsequent step of FIG. 3B.

The coil devices 1A according to the second embodiment shown in FIGS. 3A to 3C have the same configuration and exhibit the same operational effects, as the coil device 1 according to the first embodiment except for the following. Each member of the coil device 1A shown in FIGS. 3A to 3C corresponds to each members of the coil device 1 according to the first embodiment shown in such as FIGS. 2E to 2 G, and the same reference numerals are given to the corresponding members. The explanation is partly omitted.

The coil device 1A has the coil part 30A. The coil part 30A has the first layer formed by the first wire 31 and the second layer provided on the outer periphery of the first layer and formed with the second wire 32.

In manufacturing the coil device 1A, each step shown in FIGS. 2A to 2D is carried out in the same manner as described in the first embodiment. Next, as shown in FIG. 3A, the first wire 31 and the second wire 32 are wound around the winding core part 12 in two layers. Next, the lead-out part 310 of the first wire 31 is drawn out to the second upper surface electrode part 420 of the second terminal electrode 42 of the flange part 14*b*, and connected as shown in FIG. 3B to form the first connecting part 311.

Similarly, the lead-out part 320 of the second wire 32 is lead out to the first upper surface electrode part 410 of the first terminal electrode 41 of the flange part 14*b*, and connected as shown in FIG. 3B to form the second connecting part 321. Next, as shown in FIG. 3C, an unnecessary part of the first wire 31 (lead-out part 310) protruding from the second upper surface electrode part 420 and an unnecessary part of the second wire 32 (lead-out part 320) protruding from the first upper surface electrode part 410 are cut by the cutting tool 60.

Figure 4:
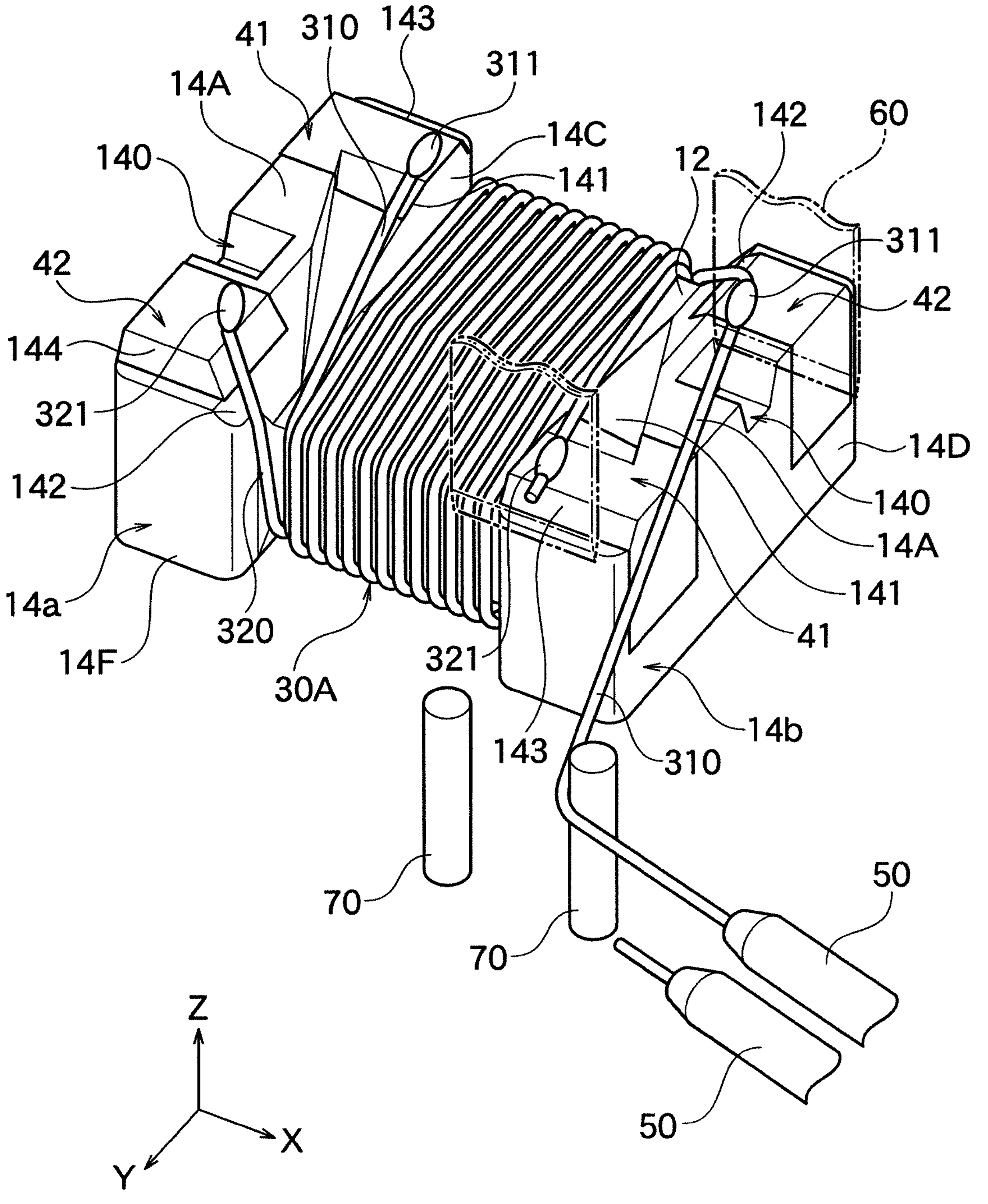
FIG. 4 is another perspective view showing the step of FIG. 3C

As shown in FIG. 4, the unnecessary part of the second wire 32 (the lead-out part 320) may be cut at a position separated from the third inclined surface 143 in the Y axis direction. In that case, an unnecessary part of the second wire 32 may remain at the tip of the second connecting part 321 as shown in FIG. 4. The detailed illustration is omitted, but the same is applied to cutting the unnecessary part of the first wire 31 (the lead-out part 310) inside the concave part 140.

It should be noted that the present invention is not limited to the above-described embodiments, and can be variously modified within the scope of the invention.

In the above embodiment, the widths W3, W4 and the height H2 of the concave part 140 shown in FIG. 1B are not particularly limited, and may be appropriately changed according to the size of the cutting tool. However, from the viewpoint of easily entering at least a part of the cutting tool inside the concave part 140, it is preferable that the widths W3, W4 and the height H2 are large, and from the viewpoint of improving the inductance of the coil device 1, the widths W3, W4 and the height H2 are preferably as small as possible.

Specifically, the ratio W3/W1 of the width W3 in the X axis direction of the concave part 140 on the upper surface 14A to the width W1 in the X axis direction of the flange part 14 is preferably 0.1 to 0.6, more preferably 0.3 to 0.5. The width W4 in the Y axis direction of the concave part 140 on the upper surface 14A may be determined according to the distance between the first terminal electrode 41 and the second terminal electrode 42. In the illustrated example, the width W4 is substantially the same as the width W3, but it may be different. The ratio H2/H1 of the height H2 in the Z axis direction of the concave part 140 shown in FIG. 1C to the height H1 in the Z axis direction of the flange part 14 is preferably 0.5 to 0.9, more preferably 0.6 to 0.8.

The minimum width W5 between the concave part 140 and the first inclined part 141 shown in FIG. 1B is not particularly limited, and may be appropriately determined considering the widths W1 and W3. However, the minimum width W5 between the concave part 140 and the first inclined part 141 is at least 0.05 mm or more.

The size of the coil device 1 is not particularly limited, but the length L in X axis direction is 1.15 to 1.35 mm, the width W2 in Y axis direction is 0.9 to 1.1 mm, and the height H1 (see FIG. 1C) in Z axis direction is 0.45 to 0.53 mm. The ratio W6/W2 of Y axis direction width W6 of the winding core part 12 shown in FIG. 2A to the Y axis direction width W2 of the flange parts 14, 14 shown in FIG. 1B is preferably 0.6 to 0.9.

Further, according to the first embodiment, each lead-out part 310 of the first wire 31 may be connected to the first terminal electrode 41 of the first flange part 14*a* and the first terminal electrode 41 of the second flange part 14*b*. Similarly, the lead-out parts 320 of the second wire 32 may be respectively connected to the second terminal electrode 42 of the first flange part 14*a* and the second terminal electrode 42 of the second flange part 14*b*. In this case, for example, before or after forming the coil part 30, the first wire 31 and the second wire 32 are made to intersect (twist the pair of wires 31, 32), whereby the positional relation of the first wire 31 and the second wire 32 may be reversed from the example shown in FIG. 1A.

In the second embodiment, the respective lead-out parts 310 of the first wire 31 may be respectively connected to the first terminal electrode 41 of the first flange part 14*a* and the first terminal electrode 41 of the second flange part 14*b*. Similarly, the lead-out parts 320 of the second wire 32 may be respectively connected to the second terminal electrode 42 of the first flange part 14*a* and the second terminal electrode 42 of the second flange part 14*b*.

Figure 5:
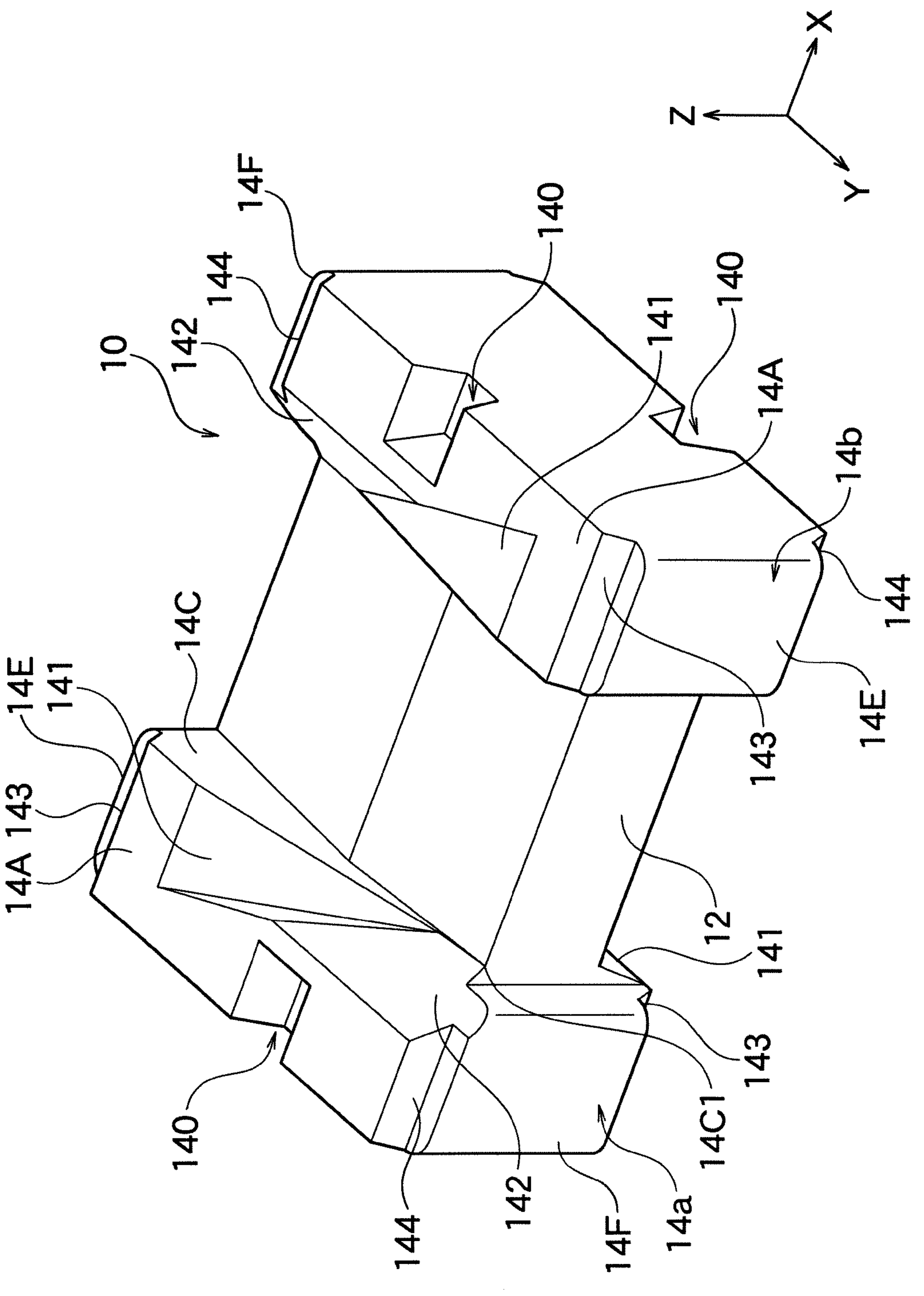
FIG. 5 is an overall perspective view of a modified example of the core of the coil device shown in FIG. 1A.

In the above embodiments, as shown in FIG. 2A, the concave part 140 and the first inclined part 140 are formed only on the upper surface 14A of the flange part 14. However, as shown in FIG. 5, they may be formed also on the lower surface 14B of the flange part 14. In this case, when the core 10 is reversed, it is preferable to make the direction in which the first groove part 141 extends and the relative position of the concave part 140 of the upper surface (a front surface) 14A coincide with the same of lower surface (a back surface) 14B, in order to make the outer shape of the flange part 14 as viewed from the upper surface 14A substantially coincide with the outer shape of the flange part 14 as viewed from the lower surface 14B.

Further, in each of the above embodiments, as shown in FIG. 2B, the case where the first terminal electrode 41 is made by the first upper surface electrode part 410 and the first side surface electrode part 411 is exemplified, however, the first side surface electrode part 411 may be omitted. Similarly, for the second terminal electrode 42, the second side surface electrode part 421 may be omitted.

In each of the above embodiments, the range of the first upper surface electrode part 410 may be expanded to the outer side in the Y axis direction of the third inclined part 143, and the end part in the Y axis direction of the flange part 14 may be covered with the first upper surface electrode part 410. Further, the range of the first side surface electrode part 411 may be extended to the outer side in the Y axis direction of the flange part 14, and the end part in the Y axis direction of the flange part 14 may be covered with the first side surface electrode part 411.

Similarly, the range of the second upper surface electrode part 420 may be extended to the outer side of the fourth inclined part 144 in the Y axis direction, and the end part of the flange part 14 in the Y axis direction may be covered with the second upper surface electrode part 420. Further, the range of the second side surface electrode part 421 may be expanded to the outside of the flange part 14 in the Y axis direction, and the end part of the flange part 14 in the Y axis direction may be covered with the second side surface electrode part 412.

NUMERICAL REFERENCES 1, 1A . . . Coil Device
10 . . . Drum Core
12 . . . Winding Core Part
14, 14a, 14b . . . Flange Part
14A . . . Upper
14B . . . Lower
14C . . . Inner End Surface
14C1 . . . Intersection Line
14D . . . Outer End Surface
14E . . . First Lateral Side Surface
14F . . . Second Lateral Side Surface -continued

| NUMERICAL REFERENCES |
| --- |
| 140 . . . Concave Part |
| 140a . . . First Side Wall |
| 140b . . . Second Side Wall |
| 140c . . . Third Side Wall |
| 140d . . . Fourth Side Wall |
| 141 . . . First inclined part |
| 142 . . . Second inclined part |
| 143 . . . Third inclined part |
| 144 . . . Fourth inclined part |
| 145 . . . Wall |
| 146 . . . Step Part |
| 20 . . . Plate-Shaped Core |
| 30, 30A . . . Coil Part |
| 31 . . . The First Wire |
| 310 . . . Lead-Out Part |
| 311 . . . The First Connecting Part |
| 32 . . . The Second Wire |
| 320 . . . Lead-Out Part |
| 321 . . . The Second Connecting Part |
| 41 . . . The First Terminal Electrode |
| 410 . . . The First Upper Surface Electrode Part |
| 411 . . . The First Side Surface Electrode Part |
| 42 . . . The Second Terminal Electrode |
| 420 . . . The Second Upper Surface Electrode Part |
| 421 . . . The Second Side Surface Electrode Part |
| 50 . . . Nozzle |
| 60 . . . Cutting Tool |
| 70 . . . Pole |

The invention claimed is:

1. A coil device comprising:

a core comprising a winding core part and a flange part at an axial end part of the winding core part, a coil part comprising a first wire and a second wire wound around the winding core part, a first terminal electrode on a mounting surface of the flange part and to which a lead-out part of the first wire is connected, and a second terminal electrode (i) on the mounting surface of the flange part, (ii) spaced from the first terminal electrode along the mounting surface and (iii) to which a lead-out part of the second wire is connected, wherein the flange part comprises a concave part and a wall, a bottom surface of the concave part is located closer to one of the first terminal electrode and the second terminal electrode than to another of the first terminal electrode and the second terminal electrode between the first terminal electrode and the second terminal electrode, the wall (i) includes a first side surface defined by the concave part and a second side surface defined by an inner end surface of the flange part at the axial end part and (ii) extends upwardly from the bottom surface of the concave part between the concave part and the inner end surface of the flange part, the first side surface and the second side surface are opposing surfaces, the concave part has the bottom surface, the first side surface, a first facing surface and a second facing surface facing the first facing surface, the first side surface, the first facing surface and the second facing surface extend upwardly from the bottom surface, and the first side surface is connected to the first facing surface and the second facing surface.

2. The coil device according to claim 1, wherein the lead-out part of the second wire extends obliquely from an outer periphery of the winding core part through the second terminal electrode toward the concave part, when viewed from the mounting surface.

3. The coil device according to claim 1, wherein an end part of the lead-out part of the second wire is on the second terminal electrode close to the concave part.

4. The coil device according to claim 2, wherein an end part of the lead-out part of the second wire is on the second terminal electrode close to the concave part.

5. The coil device according to claim 1, wherein the inner end surface includes an inclined part that is inclined from an outer periphery of the winding core part toward the first terminal electrode, the lead-out part of the first wire extends along an inclined surface of the inclined part from the outer periphery of the winding core part toward the first terminal electrode, and the wall is between the inclined part and the first side surface.

6. The coil device according to claim 2, wherein the inner end surface includes an inclined part that is inclined from the outer periphery of the winding core part toward the first terminal electrode, the lead-out part of the first wire extends along an inclined surface of the inclined part from the outer periphery of the winding core part toward the first terminal electrode, and the wall is between the inclined part and the first side surface.

7. The coil device according to claim 1, wherein an outer shape of the flange part as viewed from a front and an outer shape of the flange part as viewed from a back substantially coincide with each other, when the core is reversed.

8. The coil device according to claim 2, wherein an outer shape of the flange part as viewed from a front and an outer shape of the flange part as viewed from a back substantially coincide with each other, when the core is reversed.

9. A coil device comprising:

a core comprising a winding core part, a first flange part at an axial end part of the winding core part, and a second flange part at another axial end part of the winding core part, a coil part comprising a first wire and a second wire wound around the winding core part, a first terminal electrode on a mounting surface of the first flange part and connected to one lead-out part of the first wire, a second terminal electrode (i) on the mounting surface of the first flange part, (ii) spaced from the first terminal electrode and (iii) connected to one lead-out part of the second wire, a third terminal electrode on the mounting surface of the second flange part and connected to a second lead-out part of the second wire, and a fourth terminal electrode (i) on the mounting surface of the second flange part, (ii) spaced apart from the third terminal electrode and (iii) connected to a second lead-out part of the first wire, wherein the first flange part comprises a concave part and a wall, a bottom surface of the concave part is located closer to one of the first terminal electrode and the second terminal electrode than to another of the first terminal electrode and the second terminal electrode between the first terminal electrode and the second terminal electrode, the wall (i) includes a first side surface defined by the concave part and a second side surface defined by an inner end surface of the flange part at the axial end part and (ii) extends upwardly from the bottom surface of the concave part between the concave part and the inner end surface of the flange part, the first side surface and the second side surface are opposite surfaces, the concave part has the bottom surface, the first side surface, a first facing surface and a second facing surface facing the first facing surface, the first side surface, the first facing surface and the second facing surface extend upwardly from the bottom surface, and the first side surface is connected to the first facing surface and the second facing surface.

10. The coil device according to claim 9, wherein:

the inner end surface of the first flange part includes a first inclined part that is inclined from an outer periphery of the winding core part toward the first terminal electrode, and an inner end surface of the second flange part includes a second inclined part that is inclined from the outer periphery of the winding core part toward the third terminal electrode, wherein the one lead-out part of the first wire extends along an inclined surface of the first inclined part of the first flange part from the outer periphery of the winding core part toward the first terminal electrode, and the second lead-out part of the second wire extends along an inclined surface of the second inclined part of the second flange part from the outer periphery of the winding core part toward the third terminal electrode.

11. A core comprising:

a winding core part, and a flange part at an axial end part of the winding core part, wherein the flange part comprises a concave part and a wall, when viewed from a direction parallel to the axial direction of the winding core part, a bottom surface of the concave part is located closer to one end of the flange part than the other end of the flange part, the wall (i) includes a first side surface defined by the concave part and a second side surface defined by an inner end surface of the flange part at the axial end part and (ii) extends upwardly from the bottom surface of the concave part between the concave part and the inner end surface of the flange part, the first side surface and the second side surface are opposite surfaces, the concave part has the bottom surface, the first side surface, a first facing surface and a second facing surface facing the first facing surface, the first side surface, the first facing surface and the second facing surface extend upwardly from the bottom surface, and the first side surface is connected to the first facing surface and the second facing surface.

* * * * *